(12) United States Patent  (10) Patent No.: US 11,542,803 B2
Gunnerud et al.  (45) Date of Patent: Jan. 3, 2023

(54) RECORDING DATA FROM FLOW NETWORKS

(71) Applicant: SOLUTION SEEKER AS, Oslo (NO)

(72) Inventors: Vidar Gunnerud, Oslo (NO); Anders Sandnes, Oslo (NO); Vidar Thune Uglane, Oslo (NO); Stine Ursin-Holm, Oslo (NO)

(73) Assignee: SOLUTION SEEKER AS, Oslo (NO)

(*) Notice: Subject to any disclaimer, the term of this patent is extended or adjusted under 35 U.S.C. 154(b) by 355 days.

(21) Appl. No.: 16/610,297

(22) PCT Filed: May 3, 2018

(86) PCT No.: PCT/EP2018/061388
§ 371 (c)(1),
(2) Date: Jan. 22, 2020

(87) PCT Pub. No.: WO2018/202796
PCT Pub. Date: Nov. 8, 2018

(65) Prior Publication Data
US 2020/0080407 A1  Mar. 12, 2020

(30) Foreign Application Priority Data
May 4, 2017  (GB) .................................. 1707116

(51) Int. Cl.
*E21B 21/08*  (2006.01)
*E21B 44/00*  (2006.01)
(Continued)

(52) U.S. Cl.
CPC .............. *E21B 43/34* (2013.01); *E21B 21/08* (2013.01); *E21B 43/122* (2013.01); *E21B 44/00* (2013.01);
(Continued)

(58) Field of Classification Search
CPC ........ E21B 47/008; E21B 21/08; E21B 44/00; E21B 43/34; E21B 43/122; E21B 41/00;
(Continued)

(56) References Cited

U.S. PATENT DOCUMENTS 3,559,476 A  2/1971  Kuo
3,908,454 A  9/1975  Mullins et al.
(Continued)

FOREIGN PATENT DOCUMENTS

CN  105492874 A  4/2016
GB  2317406 A  3/1998
(Continued)

OTHER PUBLICATIONS

A Simple Data-Driven Approach to Production Estimation and Optimization B.. Grimstad; V.. Gunnerud; A.. Sandnes; S.. Shamlou; I. S. Skrondal; V.. Uglane; S.. Ursin-Holm; B.. Foss Paper No. SPE-181104-MS (Year: 2016).*

(Continued)

*Primary Examiner* — John E Johansen
(74) *Attorney, Agent, or Firm* — Banner & Witcoff, Ltd.

(57) ABSTRACT

A method for recording data relating to the performance of an oil and gas flow network uses statistical data to represent raw data in a compact form. Categories are assigned to time intervals in the data. The method comprises: (1) gathering data covering a period of time, wherein the data relates to the status of one or more control point(s) within the flow network and to one or more flow parameter(s) of interest in one or more flow path(s) of the flow network; (2) identifying multiple time intervals in the data during which the control points and the flow parameter(s) can be designated as being in a category selected from multiple categories; (3) assigning a selected category of the multiple categories to each one of the multiple datasets that are framed by the multiple time (Continued)

intervals; and (4) extracting statistical data representative of some or all of the datasets identified in step (2) to thereby represent the original data from step (1) in a compact form including details of the category assigned to each time interval in step (3).

20 Claims, 8 Drawing Sheets

(51) Int. Cl.
 E21B 47/008 (2012.01)
 E21B 43/34 (2006.01)
 E21B 43/12 (2006.01)
 G05B 13/04 (2006.01)
 E21B 43/00 (2006.01)
 E21B 41/00 (2006.01)

(52) U.S. Cl.
 CPC ............ *E21B 47/008* (2020.05); *G05B 13/04* (2013.01); *G05B 13/041* (2013.01); *G05B 13/042* (2013.01); *G05B 13/048* (2013.01); *E21B 41/00* (2013.01); *E21B 43/00* (2013.01)

(58) Field of Classification Search
 CPC ....... E21B 43/00; G05B 13/04; G05B 13/042; G05B 13/048; G05B 13/041
 USPC .......................................................... 703/10
 See application file for complete search history.

(56) References Cited

U.S. PATENT DOCUMENTS

| | | | |
|---|---|---|---|
| 4,458,245 A | 7/1984 | Crosnier et al. | |
| 5,144,590 A | 9/1992 | Chon | |
| 5,220,504 A | 6/1993 | Holzhausen et al. | |
| 5,662,165 A | 9/1997 | Tubel et al. | |
| 6,333,700 B1 | 12/2001 | Thomeer et al. | |
| 6,650,280 B2 | 11/2003 | Arndt et al. | |
| 6,724,687 B1 | 4/2004 | Stephenson et al. | |
| 6,920,085 B2 | 7/2005 | Finke et al. | |
| 8,261,819 B1 | 9/2012 | Gibbs et al. | |
| 2002/0027004 A1 | 3/2002 | Bussear et al. | |
| 2002/0082815 A1 | 6/2002 | Rey-Fabret et al. | |
| 2003/0038734 A1 | 2/2003 | Hirsch et al. | |
| 2003/0213591 A1 | 11/2003 | Kuchuk et al. | |
| 2006/0108120 A1 | 5/2006 | Saucier | |
| 2009/0067288 A1 | 3/2009 | Godager | |
| 2009/0308601 A1 | 12/2009 | Poe, Jr. et al. | |
| 2010/0023269 A1* | 1/2010 | Yusti ....................... | E21B 43/00 702/12 |
| 2011/0119037 A1 | 5/2011 | Rashid et al. | |
| 2012/0146805 A1 | 6/2012 | Vick, Jr. et al. | |
| 2012/0185220 A1 | 7/2012 | Shippen | |
| 2014/0262235 A1 | 9/2014 | Rashid et al. | |
| 2014/0351183 A1* | 11/2014 | Germain ................. | E21B 44/00 706/12 |
| 2015/0308627 A1* | 10/2015 | Hoskins ................... | E03B 7/00 702/45 |
| 2016/0054713 A1* | 2/2016 | Foss ........................ | E21B 41/00 700/282 |

FOREIGN PATENT DOCUMENTS

| | | |
|---|---|---|
| GB | 2544098 A | 5/2017 |
| WO | 2011042448 A2 | 4/2011 |
| WO | 2013072490 A2 | 5/2013 |
| WO | 2013188241 A2 | 12/2013 |
| WO | 2014098812 A1 | 6/2014 |
| WO | 2014170425 A2 | 10/2014 |

OTHER PUBLICATIONS

Lagrangian Decomposition of Oil-Production Optimization Applied to the Troll West Oil Rim Bjarne Foss; Vidar Gunnerud; Marta Dueñas Díez SPE J. 14 (04): 646-652. Paper No. SPE-118299-PA (Year: 2009).*
Sep. 27, 2018—(WO) International Search Report and Written Opinion—App PCT/EP2018/061388.
Sep. 14, 2017—(GB) Search Report—APP 1707116.8.
Apr. 25, 2017—(WO) International Search Report and Written Opinion—App PCT/EP2016/076757.
Jun. 14, 2016—(GB) Search Report—APP 1519637.1.
May 31, 2021—(CN) Office Action application 201880029563.X with English Translation.

* cited by examiner

RECORDING DATA FROM FLOW NETWORKS

The present invention relates to an apparatus and a method for recording data relating to the performance of an oil and gas flow network, for example in order to gather data for analysis to improve the performance of the flow network or to obtain increased data to determine how the flow network is operating. The invention may be used with oil and gas production networks, for example where multiple wells supply single or multiphase fluids to a network that combines the flows via manifolds and the like.

There are many industries where flow networks are used, for example in the processing and manufacturing of fluid and liquid products in factories and refineries. The oil and gas industry is an example of particular interest since the flow network includes oil and gas wells resulting in inputs to the flow network that can be difficult to model and in many cases may vary unpredictably. Further, the availability of critical process components changes with time and thereby capacities vary equivalently. It is thus difficult to optimise production settings for such networks. Simulations and models can be used in an attempt to predict the response of flow networks to changes in process parameters such as flows, pressures, mixing of different constituents and so on. However these models and accompanying optimisation problems can become very cumbersome and require significant computing power, whilst still providing nothing more than a computer assisted guess for optimum settings for the flow network.

WO2014/170425 discloses a method for control of an oil and gas flow network for improving performance, the method involving applying excitations at control points of the flow network as online 'experiments' to allow for identification of variations induced by the excitations and hence allow for iterative adjustment of the control of the flow network to improve performance. This approach provided a significant advance in the art, in particular in relation to optimisation of performance. However, it has various restrictions including the need for excitations and it also does not have a particularly broad application in terms of the output of the process.

Viewed from a first aspect, the present invention provides a method for recording data relating to the performance of an oil and gas flow network, the method comprising: (1) gathering data covering a period of time, wherein the data relates to the status of one or more control points within the flow network and to one or more flow parameter(s) of interest in one or more flow path(s) of the flow network; (2) identifying multiple time intervals in the data during which the control point(s) and the flow parameter(s) can be designated as being in a category selected from multiple categories relating to different types of stable production and multiple categories relating to different types of transient events, wherein the data hence includes multiple datasets each framed by one of the multiple time intervals; (3) assigning a selected category of the multiple categories to each one of the multiple datasets that are framed by the multiple time intervals; and (4) extracting statistical data representative of some or all of the datasets identified in step (2) to thereby represent the original data from step (1) in a compact form including details of the category assigned to each time interval in step (3).

Thus, the large volumes of data that are recorded for an oil and gas flow network can be categorised and compacted based on the categorisation of datasets within the time intervals and by the use of statistics. There may be multiple control points, which may be in different branches of the flow network. The resulting statistical data can represent certain aspects of the original data in a far more compressed form, and it can also be more readily searched in order to identify required events or patterns of events. This statistical data can be stored in a compact database. The statistical data can provide information concerning the operation of the flow network, allowing the flow network to be assessed either directly or via further analysis, for example by using local models as discussed below. The data relating to performance of the flow network may be gathered for checking if the network is performing optimally and/or for providing qualitative and/or quantitative information on the performance of the flow network, for example production levels for oil and/or gas. The performance of the flow network in this context may include both production rate as well as ensuring integrity. Thus, the data recorded may be used both for finding ways to increase productivity during production and also for reducing non-producing time by predicting equipment or well failure, or improving the integrity of the system, i.e. by enabling better predictive maintenance, reducing failures and so on. The data may be used in assessment of the flow network for determining adjustments to the control points that would improve performance of the flow network.

The data should be gathered over a period of time in order to allow for multiple time intervals to be established. Advantageously, this method allows for assessment of a flow network based on data that is already being recorded for other purposes, for example for on-going monitoring by the operator and based on data that has been stored during past use of the flow network. That is to say, the method may be applied using historical data, i.e. data that was gathered prior to implementation of the method, and identification of steady state intervals that have occurred during normal operation of the flow network. It can also make use of data gathered on an on-going basis during continued operation of the flow network. Unlike some earlier proposed methods, for example as in WO2014/170425, there is no need for specific excitations to be applied: instead data gathered during normal use of the flow network can be used.

The time intervals frame datasets that can be categorised in one of various categories including multiple categories of stable production and multiple categories of transient events. In the case of transient events the categories may be split into two sets defining (i) categories arising in relation to active events, i.e. events that occur due to deliberate intervention on the flow network and (ii) categories arising in relation to passive events, i.e. events that occur unintentionally without any deliberate intervention.

The multiple categories relating to stable production may include: stable steady state production; stable production with flush production from one or more wells; stable production with slugging dynamics present, such as casing heading, severe slugging or other slugging dynamics; stable production including sand production, and stable production with drilling mud or chemicals (e.g. scale squeeze or acid stimulation) that need to be cleaned up.

The multiple categories relating to transient events may include one or more active event categories and one or more passive event categories. Active event categories may include: one or more of well testing events, active process events, active well events, and/or active reservoir events. Well testing event categories may include one or more of test separator flow rate testing, deduction testing, 'SmartX' testing as described in WO 2013/072490, multirate testing using choke or gas lift changes, well integrity testing, Downhole Safety Valve (DHSV)-cycle testing, Pressure Build-up (PBU)-testing, Gas-lift Valve (GLV)-testing, and Inflow Control Valve (ICV)-testing. Active process event categories may include equipment maintenance and/or gas backflow into wells. Active well event categories may include one or more of scale squeeze (injection of chemicals into a well to prevent formation of scale), well re-stimulation (injection of chemicals into a reservoir near the well to improve production), well clean-up flow (well production routed away from production separator to clean up well flow), and/or ramp-up after shut-in. Active reservoir event categories may include draw-down pressure dynamics due to well opening and/or build up pressure dynamics due to well closing.

Passive event categories may include one or more of passive process events, passive reservoir/well events or sensor error events. Passive process event categories may include scale formation in production system and/or equipment failure such as reduced capacity at a gas compressor, reduced gas-lift pressure or a system trip. Passive reservoir/well event categories may include one or more of communication between a producing well and a well being drilled, water breakthrough in a reservoir, gas breakthrough in a reservoir and/or sudden changes in sand production. Sensor error event categories may include sensor drift, sensor failure and/or sensor gain drift.

The method may hence include using some or all of the above event types and event categories to categorise the dataset at step (3).

In order to determine which category should be designated for a dataset defined by a time interval of interest then the method may include determining the asset dynamics that are present for the dataset, where an asset dynamic is a phenomena or event that occurs during the time interval for datasets in one or more of the categories. The method may include checking which of multiple asset dynamics are present for the dataset and then selecting a category based on the combination of asset dynamics. The asset dynamics may include some or all of: depletion, flush production, build-up, draw-down, pipeline transients due to control changes, slugging dynamics, production system fluctuation and/or reservoir composition dynamics. Each asset dynamic is either present or not and there might be multiple asset dynamics present at the same time.

For example, if the dataset is concerned with a time interval that should be categorised as well ramp-up then the data arises in a situation where a well has been closed and is now being opened gradually from 0% up to e.g. 70% choke opening. This might occur over a period of 2-12 hours or more. This period defines a time interval should be categorised as "well ramp up" and will produce a dataset or data-point of statistical data in the compacted database. The asset dynamics for this category include flush production, draw-down and pipeline transient dynamics due to the frequent control changes when the well is opened a step at the time. In some cases there may be slugging dynamics and production system fluctuations but this may not always occur. Further, the reservoir may well be depleting and there will probably be reservoir composition dynamics present, as these are almost always present when an oil field is producing (this is way it produces different last year, compared to today). However, the depletion dynamics are usually slow, and may be neglected (assumed constant) for the time interval of the 2-12 hours where the ramp up event occurs. It will be appreciated that based on defined asset dynamics then a category can be assigned when certain combinations of asset dynamics are present. Thus, determining the asset dynamics that are present can lead directly to a suitable categorisation for any given time interval. In addition, some combinations of asset dynamics may indicate that the time interval includes multiple categories, so the method may include using the step of determining the asset dynamics that are present to check if a time interval needs to be split into two time intervals such that each of these smaller time intervals can be given a different category.

As well as the potential for multiple asset dynamics there may also be multiple categories assigned for the same data points in the data. That is to say, for any given time then there may be overlapping time intervals that define overlapping datasets, where each dataset has a different category. Overlapping in this context includes time intervals that are fully within a larger time interval as well as time intervals that start before another time interval has finished. Some categories are concerned with events occurring over a long time period and defining a large time interval with a dataset having such a category does not preclude defining other time intervals that are overlapping with or are within the large time interval. For example, if a well is shut-in, there will be generated a pressure build-up dataset, which can be given a suitable category referring to the pressure behaviour on the reservoir side of the closed choke valve. However, there might be generated an additional dataset at the same time, such as a steady-state dataset within the same or an overlapping time interval, since other wells may still be producing. Thus, in this example different categories can be assigned to the data with reference to the status of different wells. These two datasets might overlap, but they do not necessarily start and end at the same time. For example, the build-up dataset starts immediately when the well in question is shut-in and may after several days (potentially up to 30 days in some cases), while the stable production dataset may start after 2 hours from shut-in, when pipe-line dynamics have settled out, and this might end after some further hours (or days) when another well/control point is changed. In this instance the two datasets are partly overlapping with regards to time, however the closed valve separates the production system into one part for the closed well and one part for the rest of the production system. The presence of multiple datasets that are overlapping with respect to time and have different categories may occur for other reasons as well. Another example is well ramp-up occurring over a long period during which time there might be other datasets of other categories, such as a sensor error event. These other datasets may overlap with one end of the well ramp-up dataset or they may both start and end within the duration of the well ramp-up dataset.

The methods described herein will provide advantages even for a small number of control points (for example, just two, or three) and a simple flow network. In fact the method of the first aspect can be used in the situation where there is just a single flow path, since the advantages arising from the compacted form of the data produced at step (3) apply in that situation in the same way as for a situation where there is a more complicated network of flow paths, although there may be a lesser degree of compaction of the data. In some examples the flow network includes branches that are combined, and the method may hence include gathering data for one or more flow parameter(s) in one or more flow path(s) of the flow network in which flows of more than one of the different branches have been combined. Such a situation can provide the additional advantage that the compacted data can later be analysed to determine information relating to the separate flow paths before branches are combined.

The methods described herein may also provide advantages for data covering a relatively small time period and/or data that can be categorised with a relatively small number of datasets of different categories. However it will be appreciated that a longer time period can provide more datasets for the compacted database. Thus, the method may include using data covering a time period of a month or more, or optionally a time period of a year or more. The method may include, in step (2), identifying at least 100 time intervals in the data, or optionally at least 1000 time intervals. In some cases there may be considerably more time intervals, for example 2000 or more time intervals.

A time interval with a dataset that can be categorised as one of the multiple categories of stable production may be defined as being a time period longer than a predefined minimum during which there has been no change to a control point or a flow parameter outside of a certain threshold. This threshold may be zero, i.e. a requirement that there is no intentional change to the status of the control point.

Thus, identifying a dataset to be categorised as one of the multiple categories of stable production may require that some or all of the control points are kept stable, for example with no changes to the settings for the control points. This may be some of all of a certain set of the control points of interest (with other control points in the flow network being ignored under certain situations), or in some cases it may be all control points that can have an effect on the flow parameters of interest. Identifying a dataset to be categorised as one of the multiple categories of stable production may require that that the expected average value of the relevant flow parameter(s) should not change considerably with time during this interval. For example, there may be a requirement that the average value for a first part of the prospective time interval, as compared to the average value for a second part, does not change by more than 10%, preferably that there are no changes larger than 5%, and more preferably no changes in excess of 2%. The first and second part may be two halves of the prospective time interval, or they may be two parts out of more than two smaller divisions of the prospective time interval. The expected average value may hence be a mean average determined over a time period smaller than the total length of the prospective time interval. Identifying a dataset to be categorised as one of the multiple categories of stable production may alternatively or additionally require that the relevant flow parameter(s) originate(s) from one or more weakly stationary process(es), such that the moments up to the second order depend only on time differences. Among other things, the latter requirement means that the expected value of the flow parameter(s) should not change considerably with time during this time interval.

In an example method, determining if a flow parameter does not change considerably with time for a given time interval may including fitting linear and quadratic lines to all the data points for the flow parameter during the interval. The linear line will have a constant term and a linear term. The quadratic line will have a constant term, a linear term and a quadratic term. The linear and quadratic terms and/or lines may be used to determine if a dataset should be categorised as one of the multiple categories of stable production or if it should be categorised in some other way. For example, a large linear and/or quadratic term may indicate a transient event.

If a flow parameter holds values that oscillate around an expected average value throughout a time interval then if the total interval were to be divided into multiple intervals, for example two intervals, the expected average values for each of the smaller intervals would be approximately equal to the expected average value of the total time interval. If it changes considerably then this is an indication that there is not stable production. Consideration of the expected average value, e.g. the mean for an oscillating measurement, also provides a way to identify if a parameter originates from a weakly stationary process. In a preferred method, if any relevant flow parameter has measurement values with noise that oscillate around an expected average value that is changing significantly during a possible dataset to be categorised as one of the multiple categories of stable production then the interval is not defined as stable production, whereas if all relevant flow parameters have measurement values with noise that oscillate around expected values with no considerable variations in the expected values for the flow parameters during the interval, then this is identified as a dataset to be categorised as one of the multiple categories of stable production. Thus, as discussed above, there may be a requirement that the average value for a first part of the prospective dataset, as compared to the average value for a second part, does not change by more than 10%, preferably that there are no changes larger than 5%, and more preferably no changes in excess of 2%. The first and second part may be two halves of the prospective time interval, or they may be two parts out of more than two smaller divisions of the prospective time interval. This may be applied to multiple flow parameters and a dataset to be categorised as one of the multiple categories of stable production for a set of control points and flow parameters may be defined as being a data from a time interval when there are no changes to any of the control points, and all of the flow parameters affected by the control points have expected average values that do not change considerably with time.

Identifying a time interval during which there is stable production may include requiring a minimum time period of 1 hour, such as a minimum time selected from the range 1 to 24 hours. In some examples identifying stable production requires that there are no changes outside of the set thresholds for at least 2 hours before a stable production time interval may start, or for a time period of up to 12 hours. It is preferred to ensure that a dataset to be categorised as one of the multiple categories of stable production is identified in step (2) only when the flow parameter(s) of interest are stable. Hence, the time interval defining a dataset to be categorised as stable production may be deemed to begin only when the flow parameter(s) have stabilized after a transition due to changes in control points. This allows for any dynamic transition effects to settle down. The time interval defining a dataset to be categorised as stable production may not be allowed to continue after a point where new changes are made to any of the control point(s). When changes are made to the control signals, there will be a transition period and a shift in the expected value of the flow parameter. The data in this period may give rise to one or more time intervals where the category is one of the multiple categories relating to different types of transient events. Subsequently the production may stabilise and hence a new time interval defining a dataset to be categorised as stable production can be found.

Step (4) may include gathering the statistical data in tabular form, and optionally storing the data, for example via a computer. Thus there may be a compact data table output from step (3), and this compact data table may take the form of a database or similar that is stored in a computer memory either permanently or temporarily. Obtaining the compact data table may include, in step (2), identifying multiple time intervals in which the control points and the flow parameters of interest can be designated as being in one of the categories; in step (3) assigning the category to each of the datasets of the multiple time intervals; and then in step (4) extracting statistics representative of each of the datasets.

Thus, in a simple example, several minutes of data points for choke valve openings that do not change could be replaced by a statistical representation of a single stable production dataset in which a flow parameter or a set of flow parameters with certain value(s) are equated with a given set of choke valve openings. In a more sophisticated example, additional statistical data are derived from multiple time intervals and tabulated to provide a compact data table representing large amounts of the original data without loss of any detail that could be relevant to assessment of the flow network.

A data table of both stable production and transient events may hence be produced. This may include information about the stable production time intervals such as category, start time, duration and/or statistical information such as one or more of mean, median, variance, constant term, linear term, r-squared, and/or number of sample points. It may also include information about the transient event time intervals such as category, start time, duration and/or statistical information relating to the transient event. This statistical approach allows for a highly effective compression of the original data, and also produces sets of co-ordinates mapping the status of control points with the values of flow parameters in terms of absolute values.

Obtaining the compact data table may include identifying regions of data where adjustments have been made to some of the control points whilst the status of the other control points has remained unchanged. The adjustments may be step changes, or they may be excitations such as oscillations as described in WO2014/170425.

The method may include use of the time intervals identified at step (2) in the assessment of factors relating to performance of the flow network. This may be done by determining relationships between the status of the control point(s) and the flow parameter(s) by generating one or more local model(s) for the system based on the status of the control point(s) and the flow parameter(s) based on the time intervals. In some cases such models may be based on the time intervals with datasets categorised as stable production without reference to the datasets categorised as transient events. The determination of relationships may advantageously be done based on the statistical data extracted at step (4). This allows for an efficient processing of the data, since the models are based on the compact data provided via the extraction of statistics. Thus, the data table may be used in step (4) in order to identify relationships between absolute values for the status of the control points and for the flow parameters and to allow a local model to be formed that represents the relationships. For example, the local model may be able to predict the effect of adjustments to one or more control points on the flow parameters.

In some circumstances the compaction of the data at step (4) is not essential and in fact the determination of relationships and the creation of local models may also be done directly based on the steady state intervals, with optional use of step (4) in a preferred implementation. Thus, viewed from a further aspect the invention provides: a method of assessment of an oil and gas flow network, the method comprising: step (1), step (2) and step (3) as above, optionally step (4); determining relationships between the status of the control point(s) and the flow parameter(s) by generating one or more local model(s) for the system based on the status of the control point(s) and the flow parameter(s) as well as the categorised datasets; and, preferably, using said relationships in the assessment of factors relating to performance of the flow network. This method may use only the datasets that are categorised as stable production.

In one example, the method includes identifying adjustments that have been made in one or more of the control point(s) that result in changes to one or more of the flow parameter(s) and determining relationships between the status of the control point(s) and the flow parameter(s) by generating one or more local model(s) for the system based on the status of the control point(s) and the flow parameter(s) before and after adjustments. These local models may be based on the stable production datasets discussed above, that is to say there may be a local model based on both the data from the compact data tables as well as data concerning adjustments. Advantageously, said relationships may be used in the assessment of factors relating to performance of the flow network.

The method may include determination of one or more proposed adjustment(s) to the control points that would improve the performance of the flow network, for example by increasing or decreasing one or more of the flow parameter(s). This step may for example be based on local models as discussed below and/or relationships determined as explained above. The method may include implementing the proposed adjustment(s), and advantageously, these adjustments can then mark the start of a new time interval and/or may form an adjustment used in gathering data relating to the relationships between control points and flow parameters. This new data can then be used in the method in future analysis. In this way the method may be used for optimisation of a flow network in an on-going way such as via an iterative improvement process similar to that described in WO2014/170425.

The method may include obtaining data useful in well testing procedures and/or determining parameters or flow rates relating to the flow network, for example identifying contributions to the flow from various branches of the flow network and estimating factors relating to those branches. This may be done based on local models as discussed below and/or relationships determined as explained above. A practical example of this is to identify flow rates relating to different producing wells in an oil and gas flow network where multiple wells are coupled by manifolds and supply flow to a common separator. It is desirable to be able to identify the flow rates of each well along with factors such as the gas oil ratio (GOR) and water cut (WC).

The method may include determining one or more proposed adjustment(s) to one or more control point(s) for the purpose of obtaining additional data about the flow network. The proposed adjustment(s) may then mark the start of a new time interval and/or may form an adjustment used in gathering data relating to the relationships between control points and flow parameters. This new data can then be used in the method in future analysis. For example, it may be that there is not sufficient data in the data gathered at step (1) to allow information to be derived about a particular control point and/or a particular flow parameter. The method may hence include proposing an online 'experiment' in which a small adjustment is made allowing additional relevant data to be obtained and used in future assessment of the flow network.

The step of identifying adjustments, when used, preferably includes determining adjustments with a link to changes to one or more of the flow parameter(s) that can be easily separated from the effect of other adjustments to the control points. For example, the method may include identifying adjustments with characteristics allowing the impact of these adjustments on changes to the flow parameter(s) to be identified, for example identifying periodic adjustments where the effects of such adjustments on downstream combined flows can be determined via frequency analysis as described in WO2013/072490. The method may include disregarding adjustments that are deemed not to have an easily identifiable link with changes to the flow parameter(s) of interest.

Step (1) may include gathering data measured directly in relation to the status of the control point(s) and the flow parameter(s). This type of 'raw' data is often gathered into a real-time database by an operator for a flow network, and is stored as a record of operation of the flow network. The presently proposed methods allow effective analysis and utilisation of such data, which is often left unused, or is only used in an inefficient way due to the large size of the database. Step (1) may further include gathering data obtained by the use of observers in relation to the measured data referenced above, for example through simple calculations applied before more complex analysis is performed in later steps of the method and as discussed below. Various types of observers can be utilized, for example mass balance equations, choke models and/or Kalman filters.

The time intervals identified at step (2) may be utilised to determine relationships between the control point(s) and flow parameter(s) via local models. When statistical data has been determined, for example via step (4) of the first aspect, then this may also be used. Moreover, if there has been identification of derivative information, such as via a steady state derivative data table as discussed above, then this may be utilised along with the steady state information. For example, the derivative information may be used to provide gradient to a linear model that also includes absolute values obtained via the steady state information. This can be beneficial when there is only one absolute value available. However, it is envisaged that in many cases it will only be necessary to make use of steady state intervals when building the local models.

The local models may be linear models, or simple non-linear models. The models may be based on the statistical data in the compact data table. Regression analysis may be used in order to fit a local model to the data by mapping one or more flow parameter measurement(s) (or a related output parameter) to the status of the control points. Neural networks may be used to create the local models.

A linear model may be used, where regression analysis is carried out to fit a line or a plane to data points relating to adjustment in one or more control points and the effect on a flow parameter. A combination of absolute values from a steady state data table and gradient values from a steady state derivative data table may also be used to fit a line or a plane to the data, or a surface that is defined in several dimensions.

Non-linear models may be used if the data suggests that they are appropriate, for example a quadratic model. It may be possible to directly fit a quadratic model to some relationships, where sufficient data points exist. However, it is preferred to first generate a linear model and to then consider adding curvature via a non-linear element such as a quadratic model if the data does not fit sufficiently closely to the linear model. Minimum Frobenius norm models may be used.

When generating linear models it is preferred for the equations that form the model to be overdetermined in order to allow for a low measure of uncertainty. If there is poor or insufficient data in one or several dimensions then the method may include eliminating data points to allow for simpler model with lower uncertainty. In one example, data points for adjustments that are too small, or for control points that have not been adjusted a sufficient number of times, may be eliminated from the input data used to generate the model.

For any of the methods discussed above, the control points may be any means capable of applying a controlled adjustment to the flow network, in particular an adjustment to the flow of fluid within the network. The adjustment may be in any suitable parameter of the fluid, such as a flow and/or pressure of the fluid. For example, suitable control points may include flow control valves, pumps, compressors, gas lift injectors, expansion devices and so on. The basic principle of the above methods can be applied with any device that can apply an adjustment within conduits of the flow network. The adjustments need not only be in flow rate or pressure but may include other parameters, such as the level in a subsea separator and ESP pump setting when the method is used in an oil and gas flow network. The control point(s) and the flow parameter(s) should of course be selected with regard to the adjustment that is applied to ensure that what is being measured will be affected by the applied adjustment. In an oil and gas production flow network, a pressure adjustment will affect flow rate and pressure but may also create output variations in temperature, water cut and so on.

Since the method is applied to an oil and gas production flow network then the control points may include one or more of the following: choke control valve; gas lift valve settings or rates on wells or riser pipelines; ESP (Electric submersible pump) settings, effect, speed, pressure lift, etc.; down hole branch valve settings, topside and subsea control settings on one or more: separators, compressors, pumps, scrubbers, condensers/coolers, heaters, stripper columns, mixers, splitters, chillers, etc. (any equipment that effects production), and the adjustments may be applied accordingly.

The flow parameter(s) measured may be any parameter that is affected by the adjustment(s) applied at the control point(s). Hence, the flow parameter(s) may include one or more of pressure, flow rate (by volume or flow speed), level or temperature, all of which are parameters that may vary for an entire volume of a combined flow in response to variations in individual branches of the flow network. The flow parameter(s) could alternatively or additionally include one or more parameter(s) relating to the characteristics of the fluid in the flow network, such as a ratio of gas to liquid, proportions of certain components within the flow, density, pH and so on. In an oil and gas production flow network the flow parameter(s) may for example include water cut (WC), productivity index (PI), Gas Oil Ratio (GOR), BHP and wellhead pressures, rates after topside separation, other rate measurements, e.g. water after subsea separation, other pressures, e.g. manifold line pressure, separator pressure, other line pressures, temperatures (many places along the production system), flow velocities or sand production, amongst other things. It will be appreciated that the flow parameter(s) of interest would not necessarily include all possible flow parameters for a flow network. Instead the flow parameter(s) may include a selected set of flow parameters that are considered important to the performance of the flow network.

The flow parameters may be measured directly, for example by means of a pressure or temperature sensor, or alternatively they may be measured indirectly, for example by calculations based on directly measured parameters.

The control points may include gas lift rates. It is preferred to identify both adjustments in gas lift rates and also adjustments applied with choke valves.

Adjustments for use in determining relationships and building the local models may be identified in relation to more than one type of control point and in some preferred examples they are identified for a majority or all of the control points for which data is available in the flow network (or in a part of the flow network that is of interest). This allows an assessment to be made of the reaction of the flow network to perturbations in any of the available control mechanisms and hence allows the best possible assessment of factors relating to performance of the flow network to be carried out, for example to determine what control point adjustment will produce the most desirable change in performance, or what future adjustment will give the most useful additional data for assessing the performance of the network.

For similar reasons, it is preferable to measure a plurality of flow parameters at step (1) and in particular to measure the response for a majority of or all of the flow parameters that are relevant to the assessment of the flow network. This may for example be all flow parameters relevant to production for an oil and gas production flow network.

When the method is used to find an adjustment for the purposes of improving performance, then the improvement to the performance of the flow network may be embodied by any advantageous change in any part of the performance of the flow network. In one example the improvement includes increasing or decreasing one or more output parameters of interest and these output parameter(s) may hence the focus of the relationships between the control point(s) and flow parameter(s). The output parameter(s) may in some cases be the same as one or more of the flow parameter(s) for which data is gathered at step (1), or they may be other parameters related to those flow parameter(s) directly or indirectly. The output parameters may concern production volume or quality, for example. The improvement may alternatively include changing another aspect of the flow network.

Thus, the improvement may involve one or more of: increasing or decreasing one or more output parameter(s) of interest, increasing the accuracy of the step of determining relationships between the control point(s) and flow parameter(s), adjusting operational parameters of components of the flow network in order to increase the service life of those components or other components of the flow network, or improving another aspect of the flow network not listed above.

The output parameter(s) of interest, which the method seeks to change in some examples in order to improve performance, may be any parameter(s) of the flow network. Such a parameter may be a flow parameter of the type included at step (1), for example a total combined flow rate or a required pressure for a given production and so on. In an oil and gas production flow network the output parameter(s) of interest may for example be pressure drop across the production choke, or total production. There may be just one output parameter of interest or instead the improvement to the system may relate to a combination of output parameters. If an output parameter of interest is not measured, e.g. flow velocity, other output parameter(s) may be used, e.g. pressure and temperature, to compute the parameter of interest, if an analytical expression is known, through first order physics or through an empirical correlation.

In an alternative, which may also be carried out in addition (or in parallel) with the above improvements, the improvement to the flow network may comprise adjusting operational parameters of components of the flow network in order to increase the service life of those components or other components of the flow network, preferably without compromising other aspects of the performance of the flow network. Hence, for example one constraint applied may be that overall production should remain at or above a given level, whilst another constraint may be that there is a maximum flow rate for given parts of the flow network to avoid over-working certain components and hence extend their service life.

In some example embodiments, the method comprises:

(a) applying predetermined excitations as adjustments at multiple control points within the flow network, and/or identifying adjustment(s) made to the control points during normal operation of the flow network, wherein the multiple control points are at different branches of the flow network;

(b) receiving measurements of changes in one or more flow parameter(s) in one or more flow path(s) in which flows of more than one of the different branches have been combined;

(c) carrying out an analysis of the flow parameter measurements to identify variations induced by the adjustments and using the results of this analysis to determine said relationship between the adjustments to the control point(s) and changes in the flow parameter(s);

(d) determining an adjustment to be made at one or more of the control point(s) in order to improve the performance of the flow network and/or in order to provide additional data about the operation of the flow network;

(e) making the determined adjustment to the control point(s) of the flow network; and (f) optionally, repeating steps (a) to (e) one or more times to thereby iteratively improve the performance of the flow network and/or iteratively build knowledge about the operation of the flow network.

At step (e) the method may also allow for the possibility of making an alternative adjustment decided upon by the flow network operator, such that the operator can over-ride the proposed adjustment if circumstances require that. With the use of operator decided adjustments improvements in performance of the flow network or data about the operation of the flow network can be achieved, and this can be incorporated into a system for on-going assessment of the flow network, especially when the process is repeated iteratively. The method can derive additional information from any adjustment, whether it is proposed by a prior analysis or input based purely on the decision of the operator. The method may iterate toward an optimised solution for operation of the flow network with a mixture of operator decided adjustments and adjustments proposed based on the analysis.

The analysis at step (c) includes creating a local model, which may be a simple model such as a localised linear model and could be as discussed above. This model may then be optimised in the determination step (d) to identify the best adjustment to be applied to the control point(s).

Step (c) may include creating a local mathematical optimisation problem to calculate an adjustment of one or more of the control point(s) and in this case step (d) may include solving this optimisation problem in order to determine the required adjustment.

When the method includes adjustments applied as excitations then the excitations may take any suitable form. Different experimental patterns may be used for the excitations, such as stepwise changes, linear patterns and sinusoidal variations. Models may then be extracted from the results of these experiments and/or from suitable excitations identified in historical data, using the measurements and analysis at steps (b) and (c), and these models may be used to perform step (d). Different experimental patterns have different pros and cons. Stepwise changes are for instance easier to implement than sinusoidal patterns, while sinusoidal patterns can be easier and more precise to analyse than step changes.

In a preferred embodiment the excitations are oscillations applied at known frequencies. Preferably the oscillations applied at different control points of the multiple control points are at different test frequencies and in step (c) a frequency analysis of the measured flow parameters is carried out. The oscillations may hence be applied in parallel with the frequency analysis allowing identification of the responses resulting from excitation of the different control points. This allows a model of the flow network to be obtained for use in determining the adjustment to be made at step (d). It is particularly preferred for the techniques applied to be similar to those discussed in WO 2013/072490 by Sinvent AS and Norwegian University of Science and Technology (NTNU), which proposes the use of oscillations for monitoring of oil and gas wells.

The invention extends to the data produced by any of the methods described above, which may for example comprise the compact data table. This data is novel and inventive by virtue of its structure and content, as well as by virtue of the process by which the data is produced. The invention further extends to a local model or local models produced in accordance with the above described methods. The data and/or local model(s) may be stored, for example on a computer memory or other storage media.

Another aspect of the invention is the use of the data produced by any of the methods described above, for example the use of the compact data and/or local model(s) in the control of or assessment of the flow network.

Viewed from a further aspect, the present invention provides a data processing apparatus for assessment of an oil and gas flow network one or more control point(s), the apparatus comprising: a data analysis device arranged to carry out the method of the first aspect. Thus, the data analysis device may be arranged to (1) gather data over a period of time, wherein the data relates to the status of multiple control points at different branches within the flow network and to one or more flow parameter(s) of interest in one or more flow path(s) of the flow network; (2) identify multiple time intervals in the data during which the control point(s) and the flow parameter(s) can be designated as being in a category selected from multiple categories relating to different types of stable production and multiple categories relating to different types of transient events, wherein the data hence includes multiple datasets each framed by one of the multiple time intervals; (3) assign a selected category of the multiple categories to each one of the multiple datasets that are framed by the multiple time intervals; and (4) extract statistical data representative of some or all of the datasets identified in step (2) to thereby represent the original data from step (1) in a compact form including details of the category assigned to each time interval in step (3).

The categories may relate to events as discussed above in relation to the first aspect. The control point(s) and flow parameter(s) may be as discussed above in relation to the first aspect. There may be multiple control points and these may be at different branches of the flow network. The apparatus may be arranged to carry out any or all method steps set out above in relation to the first aspect and optional features thereof. For example, the apparatus may be arranged to determine which of a set of asset dynamics are present for each time interval in order to thereby select a suitable category for the dataset framed by the time interval.

Thus, the data analysis device may be arranged to generate a compact data table, optionally in the form of a compact database as described above. The data processing apparatus may include appropriate data storage devices for storage of the compact data table. The data processing apparatus may also store some or all of the gathered data, at least temporarily.

The invention may also provide a data processing apparatus for carrying out the method of any of the other method aspects discussed above.

Thus, one alternative aspect provides a data processing apparatus for assessment of an oil and gas flow network including multiple branches and multiple control points, wherein the multiple control points are at different branches of the flow network; the apparatus comprising: a data analysis device arranged to perform step (1), step (2) and step (3) as above, and only optionally step (4); to determine relationships between the status of the control point(s) and the flow parameter(s) by generating one or more local model(s) for the system based on the status of the control point(s) and the flow parameter(s) as well as the categorised datasets; and, preferably, to use said relationships in the assessment of factors relating to performance of the flow network.

The data processing apparatus may include a controller for controlling the status of the control points. The controller may be able to control the status of the control points to apply adjustments by sending control signals to the control points. In some preferred embodiments, the apparatus includes the control points, which may be at points distributed throughout the flow network. Alternatively, the control points may be a part of a different apparatus, whilst being directly or indirectly controllable by the controller.

The controller and the data analysis device may be separate or they may be combined into a single device, for example a computer device for control of the flow network and analysis of flow network data.

Viewed from a yet further aspect, the present invention provides a computer program product comprising instructions for execution on a data processing apparatus arranged to receive data relating control points and flow parameters in a flow network; wherein the instructions, when executed, will configure the data processing apparatus to carry out a method as described in the first aspect above, or in any of the alternative method aspects described above.

The computer program product may configure the apparatus to carry out method steps as in any or all the preferred features set out above. The data processing apparatus may include features as discussed above for apparatus of the second aspect or any of the alternative apparatus aspects described above.

Certain preferred embodiments are discussed below, by way of example only, with reference to the accompanying Figures, in which.

Figure 5:
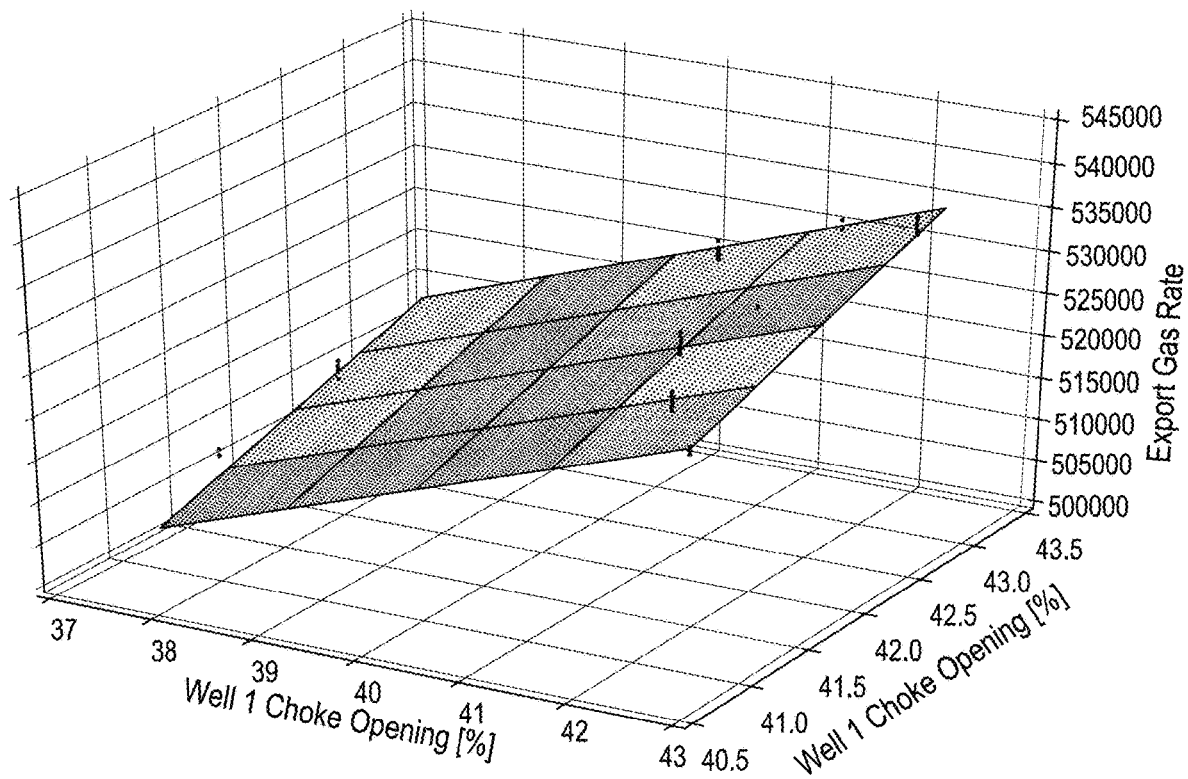
FIG. 5 shows a linear model for predicting future changes in gas production from future changes in the choke valve settings of FIG. 3.
Figure 7:
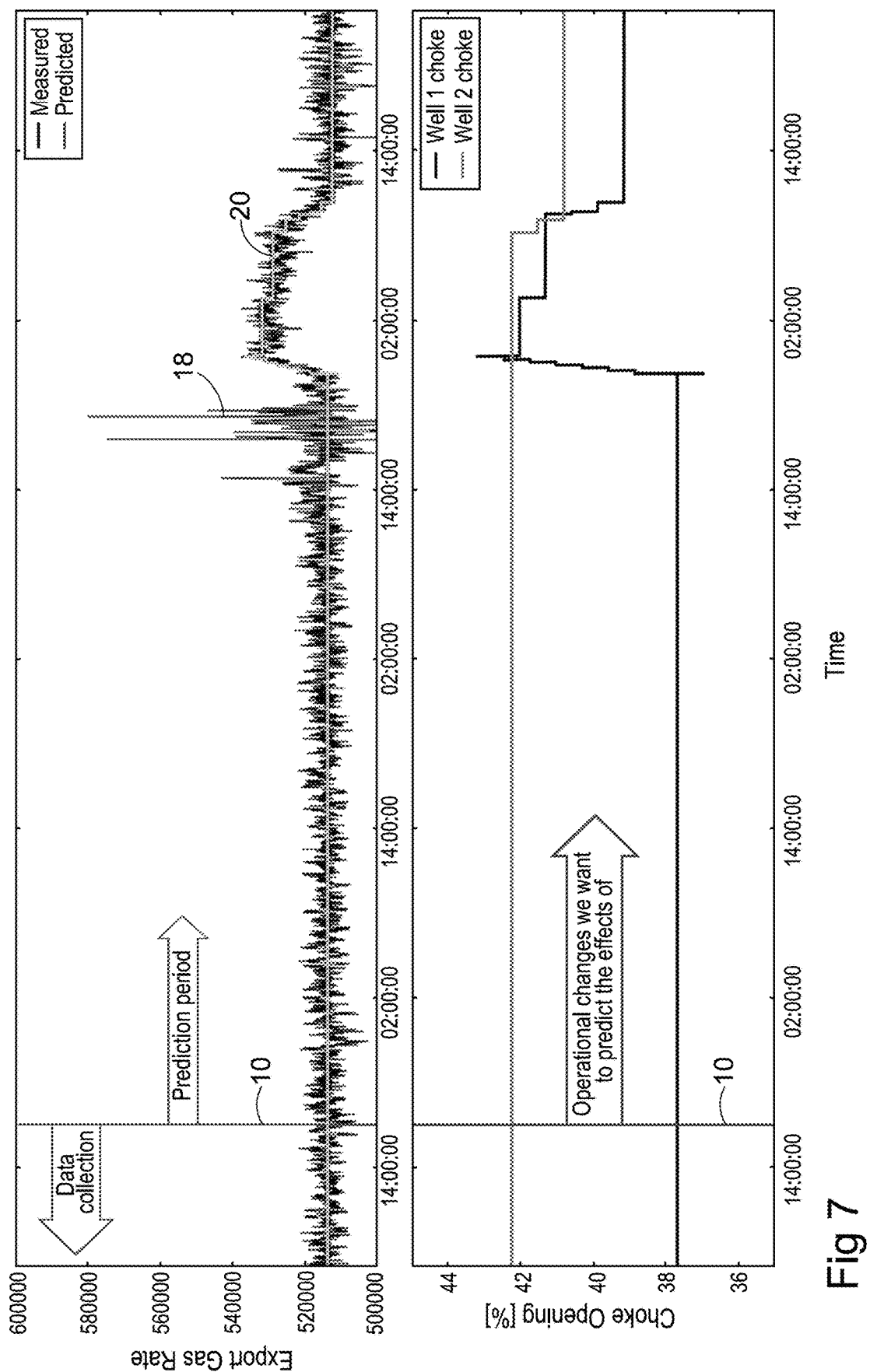
Figure 8:
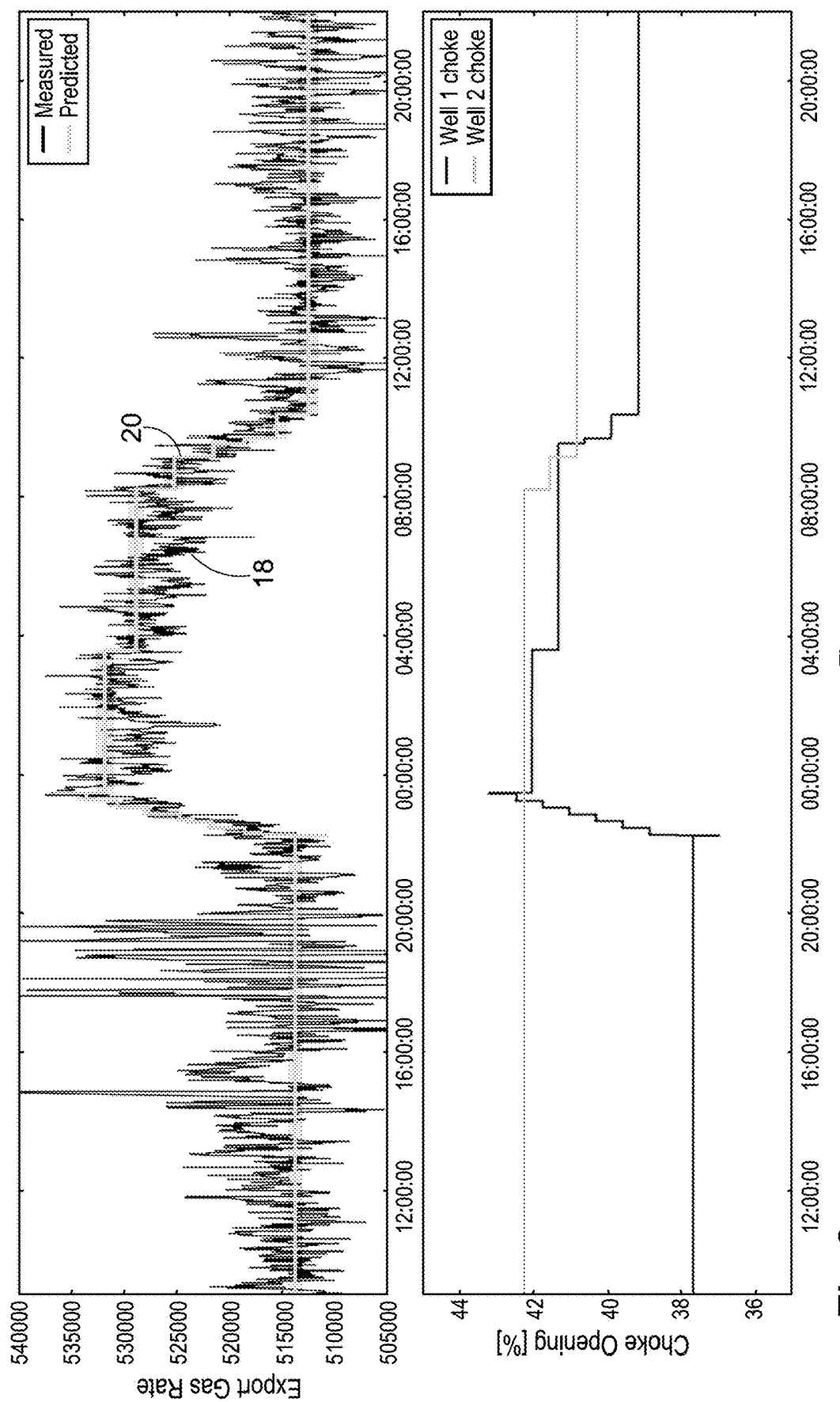
Figure 9:
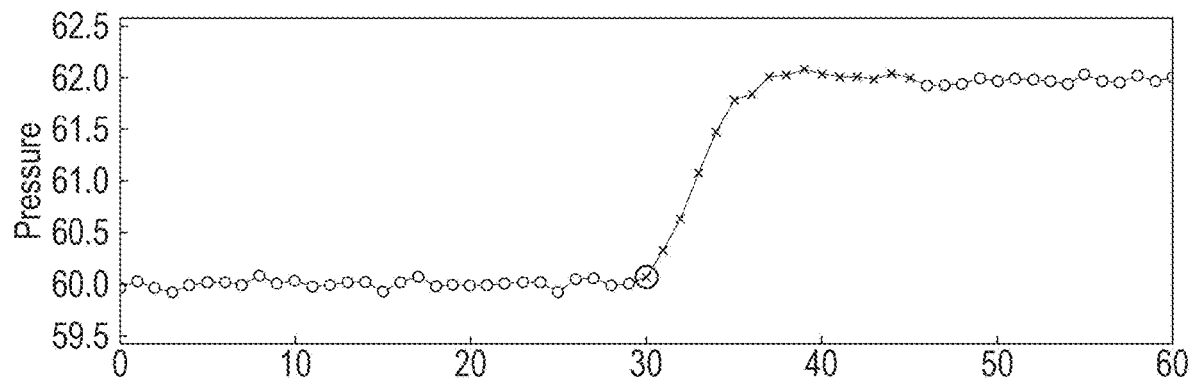
Figure 10:
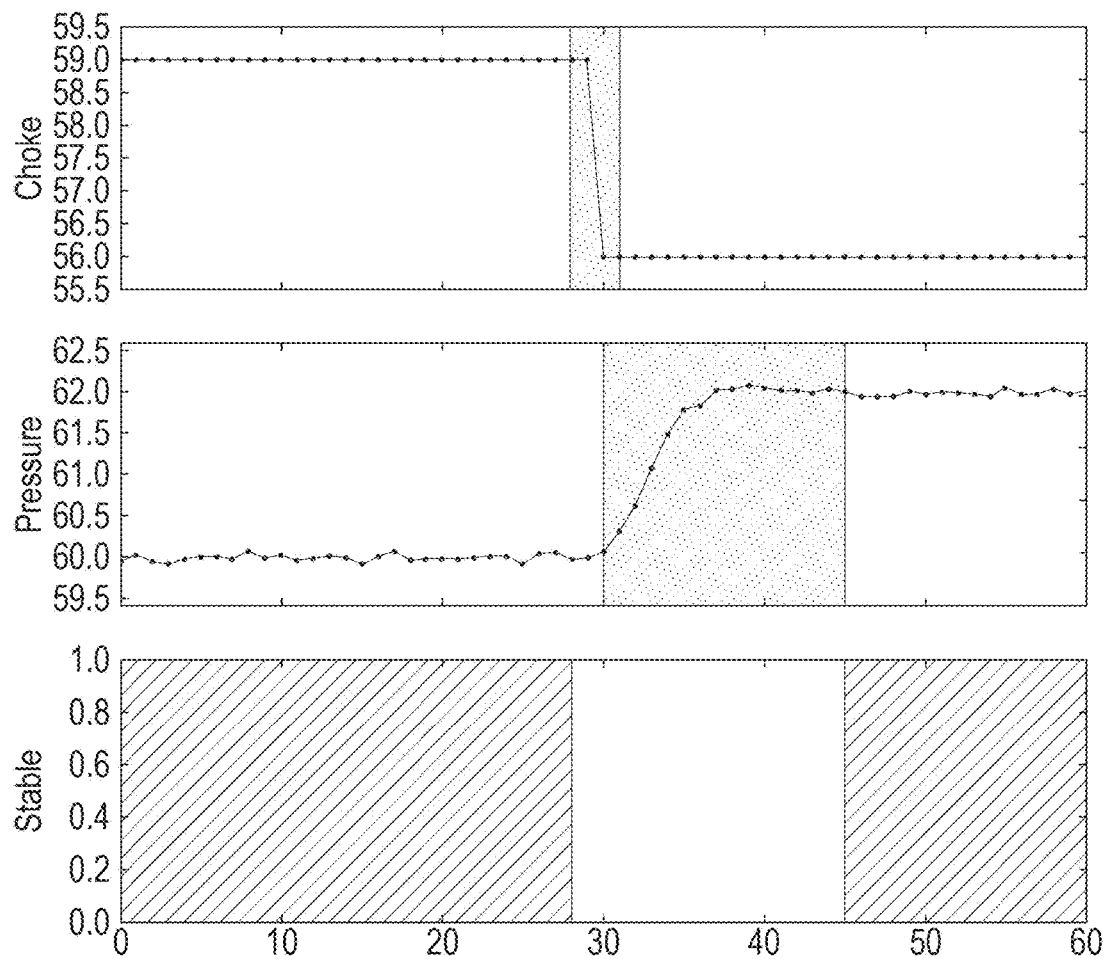

FIG. 7 compares the prediction from the linear model of FIG. 5 with real-world data arising from the same choke valve changes;

FIG. 8 is a close up view of a part of FIG. 7;

FIG. 9 shows an example of categorisation of pressure data into datasets for transient event categories and datasets for stable production categories; and FIG. 10 illustrates classification of time intervals as transient or stable as well as the identification of asset dynamics.

A key challenge in petroleum field operations is to decide the day-to-day production strategy. The same applies to the control of other similar flow networks. High quality decision making in daily operations is key to secure safe and efficient operations of complex production systems. Technology has developed rapidly, and the amount of data available from sensors and control systems at an oil-producing asset is increasing every year. This has opened an opportunity window for automating processes that today require significant human intervention. The system proposed herein intends to be a reliable mechanism for gathering and efficiently recording data that can then be used in various ways, for example to assess or improve the performance of the flow network. In this way the data that is recorded can be more effectively used in assisting decision making in this complex production environment. Combining the expertise of the operator and production engineer with this technology can access currently untapped production potential. The system is described with reference to petroleum field operations, but it will be understood that the same principles apply in other industries.

One application for the proposed methods is to optimize production rate. Optimization solutions available today rely on advanced simulators due to the vast complexity of the multiphase flow system. State of the art optimization software is thus vulnerable to inaccuracies in the simulators, and therefore relies on deep expertise from experienced production engineers in order to accurately simulate the production system. Since time is of essence in daily production planning then the data input to the simulators is often outdated and inaccurate. Thus, oil companies experience current state of the art optimization software as time-consuming, inaccurate and in many cases incorrect. A typical data flow and decision-making process, which is more or less common for all oil companies, is as follows:

1. Real-time data streams from the control system and sensors at the production installation, e.g. offshore.
2. The live data is stored in a real-time database.
3. A model of the real world problem is made through data analysis, with tuning from an expert engineer to ensure it reflects the situation correctly.
4. The software uses a mathematical optimization algorithm combined with the model to end up with a recommendation that the production engineer may apply to the production system.

The state of the art optimization approach involves significant manual input from the production engineer between step 2 and 3 to improve low quality datasets, and it requires step 3 and 4 to run complex optimization algorithms.

Due to the complexity, scarcity of humans with the right competence and the risk of human errors, some oil companies are unable to utilize their software. They are forced into a trade-off approach where the engineer performs qualified guesses based on the live data stream without utilizing a simulation or optimization model. Without an efficient decision support system, large production losses can be disguised. Thus oil companies need a simpler and more automated optimization software that provides efficient decision support without significant, time-consuming and error prone human intervention.

The example system described herein may analyse and process sensor data in order to automate dynamic "best practice" recommendations for decision makers and calculate key well parameters for separate wells without shutting down production. Advantageous features include: online experiments for enhanced information content in the data, better utilization of historical and live production data, simple automatically updated models, and a smart simplification of the production optimization problem. The proposals add to and build on the advances described in WO2013/072490 and WO2014/170425 in relation to recording data as well as optionally for using that data in the context of well-testing and production optimisation. This technology can be implemented as an online solution that allows for continuous operation during well testing and real-time recommendations for optimization on a daily basis.

The system receives historical and live data from a production installation and stores the data in a database. In an example of production optimization this data is analysed to automatically produce recommendations for adjustments to production variables and/or suggestions for online experiments, which could be along the same lines as those proposed in WO2013/072490 and WO2014/170425, but also could include alternative tests, for example using different types of excitations. These recommendations are presented to the user, which may be the production engineer and/or operator, and they can use their judgement in how they implement the recommendations. The required production changes and/or experiments are implemented through the existing control systems for the production installation, and the reaction of the production parameters to the changes/experiments is recorded for use in further cycles of the process. The system can hence be used for iterative improvements and on-going optimisation.

Another example use of the system is to identify and reduce potential risks to the integrity of the flow network, reducing down time and hence increasing output by maximising the up time.

Figure 1:
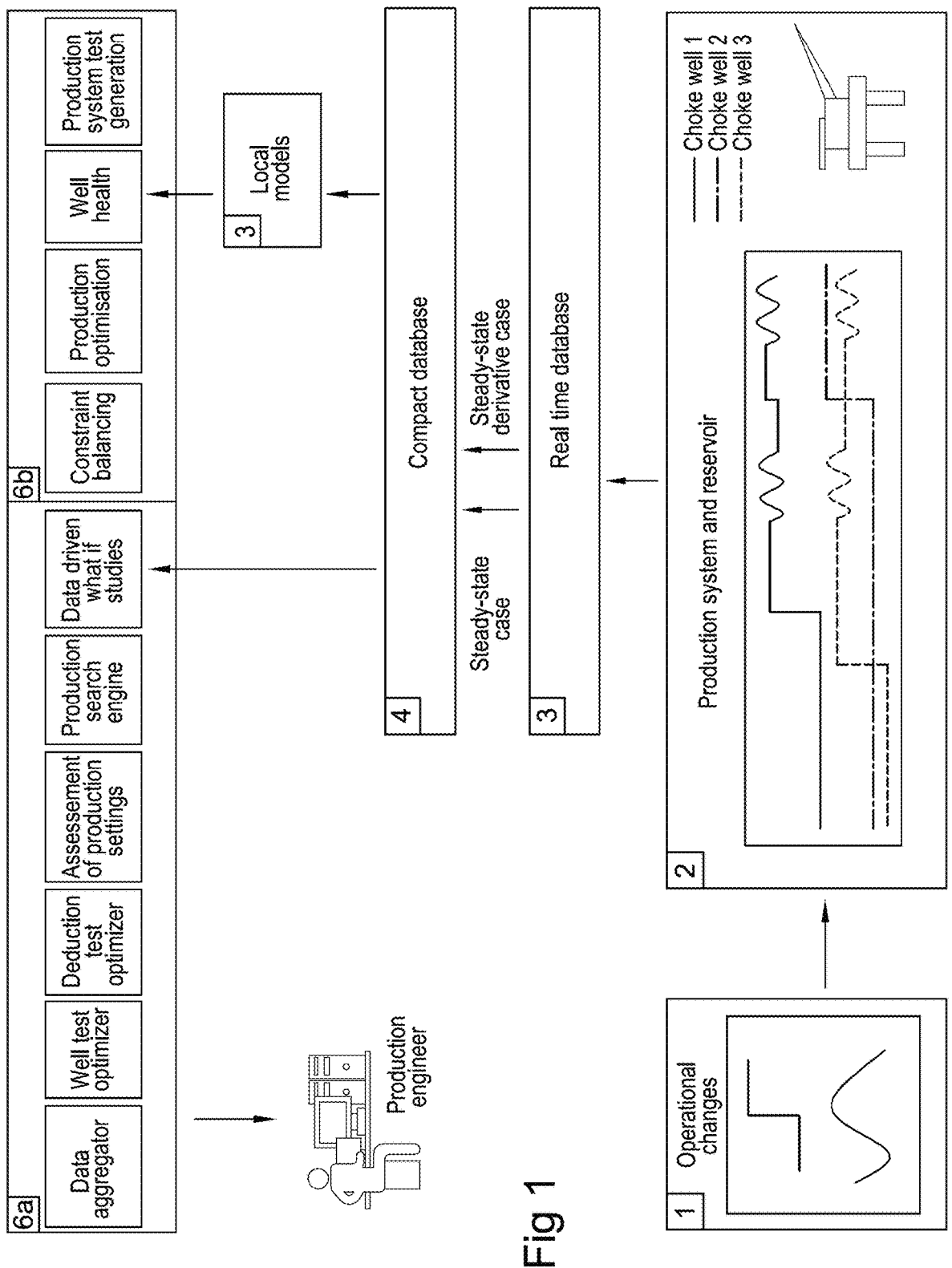
FIG. 1 is a diagram illustrating a proposed system for assessment of flow networks, including example applications for the system.

A proposed data flow and decision-making process is illustrated in FIG. 1, using oil and gas production as an example. The oil companies store large amounts of data about their production systems into their real time databases every day. This data gives the oil companies valuable feedback and an opportunity to operate the production system optimally. However, they tend to operate their production systems uniformly with few and insignificant variations. Thus, huge amounts of data do not necessarily mean high information content. By adjusting the control variables of the production system more frequently and with larger variations the production engineers can enhance the information content of the data. The technology described herein can provide suggestions for such adjustments. It will suggest changes that can be introduced to well-specific control variables such as chokes, gas-lift rates and/or electrical submersible pumps to increase the well-specific information in the data stream. The changes proposed may range from single step changes to a full oscillation test.

When multiple wells are tested using the oscillation technology, each well may be given its own recognizable footprint throughout the production system. This footprint is made by creating a sinusoidal wave that moves through the production system, by imposing accurate changes to, for instance, the choke setting of a particular well. The frequency of each well's sinusoidal wave is different, such that they can be separated from each other as the flow from all wells merges downstream. The proposed technology is able to extract this information by applying conventional frequency analysis.

The proposed system processes both the historical data stored in the real-time database as well as the live data streaming into the database. The aim is to collect and save relevant information about the production system in a more compact form in a so called compact database. Statistical analysis is used to calculate statistical information for steady state production intervals, i.e. intervals where the data represents the status of the flow network in an absolute steady state when there is no change to the system controls (e.g. no change to choke valves in an oil and gas network). A method for identifying steady state production intervals is described in more detail below. Such information provides a link between absolute values of control variables, and absolute average production values for the steady state interval values. Where changes are occurring, then information for derivative states of the system can be obtained. For example, where oscillations or recurring step changes have been introduced to the system controls, frequency analysis, e.g. the Fourier transform, can be applied to obtain steady state derivative information. In these situations absolute value information is not available for well specific measurements, but derivative information can usefully be obtained to represent the impact on the outputs of the system that arises from a change in the system control variables. In this situation the derivative state information is kept.

All generated information of interest is stored in a compact database as explained in more detail below. The information that is stored includes statistical information extracted from datasets framed by time intervals of interest as well as a category for each dataset. The categories can be as set out above, and may thus include categories relating to stable production such as: stable steady state production; stable production with flush production from one or more wells; stable production with slugging dynamics present, such as casing heading, severe slugging or other slugging dynamics; and stable production including sand production. The categories also include categories relating to transient events including one or more active event categories such as: well testing events, active process events, active well events, and/or active reservoir events; and/or one or more passive event categories such as: passive process events, passive reservoir/well events or sensor error events.

The selection of the category includes determining what category applies to a given dataset by determining what combination of asset dynamics are present for the dataset, where an asset dynamic is a phenomena or event that occurs during the time interval for datasets in one or more of the categories. The asset dynamics used in example embodiments include some or all of: depletion, flush production, build-up, draw-down, pipeline transients due to control changes, slugging dynamics, production system fluctuation and/or reservoir composition dynamics.

In the prior art asset dynamics or similar concepts are used, but these are determined manually by engineers who inspect measurement data to find the time spans of interest. An example: in order to determine a suitable start time for a well test, the engineer might inspect pressure signals to see when they stabilized and take this as the starting point.

The categorisation used in the proposed method includes detecting all of or a subset of all possible active asset dynamics. It consists of two main steps. Firstly, individual signal behaviours are classified into broad groups, including stable, oscillating or transient. These signal behaviour types may jointly be referred to as signal behaviour profiles. Secondly, these signal behaviour profiles are combined and logical rules are applied to decide which of the asset dynamics are active at a given point in time. As well as stable, oscillating and transient signal behaviour profiles other behaviours could include various degrees of failure, such as missing data or bad values. Signals can be raw data measurements, derived signals (such as the sum of flow rates), or estimated signals (such as the outputs of a Kalman-filter). The signals are grouped into control signals (that is signals that the operator may change to alter the behaviour of the network, such as choke control valves or gas-lift rates), and state signals (that is pressure, temperature and rates).

Classifiers are tailored to match signal behaviour profile characteristics found in oil and gas assets. Examples of such characteristics are:
  Piecewise constant signals with outliers, but otherwise no noise, such as chokes. These Signals can have a low sample rate (several minutes between samples).
  Dynamic, high precision, low noise signals such as pressure and temperature. These Signals often have a high sample rate (few seconds between samples).
  Dynamic, high disturbance signals such as flow rates. These signals often have a medium sample rate (seconds to minutes between samples).

Convolutional Neural Nets and/or LSTM-Nets combined with signal specific pre-processing are used to build a suitable classification algorithm. To classify each sample (e.g. stable, oscillating or transient), the classifiers must look at the surrounding samples to determine its context. Since it is inconvenient to look at all data simultaneously, a windowing approach is used. The size of this context window must be scaled to the signal behaviour and the asset dynamics, e.g. to separate transients and oscillations the context must be big enough to capture the oscillation period. All samples inside a window are classified, but the middle samples will be more certain than those towards the edges. For each sample it is also returned a certainty or uncertainty measure for the classified signal behaviour.

If one wants to determine what signal behaviour or asset dynamics are active at a certain point in time, it would be natural that this point in time will be in the middle of the context window. However, more than the middle point might be used.

If the classifier is used in a sliding window approach, it would be natural to only keep the middle sample in each iteration. In a real-time application it is possible to use the classification for the most recent samples, but the user must be aware that the classification can be changed when new data arrives.

The general framework/algorithm for the signal behaviour classification is outlined below:
  1. Get samples inside a context window
  2. Apply pre-processing (e.g. resample to uniform sample rate)

3. Run a classification algorithm on the individual signal data in the window, and classify/label all data points
4. Return/store label information, i.e. stable, oscillating, transient, and optionally the statistical certainty of this label (for middle sample or all samples)
5. Optional: Advance window and repeat in a real-time setting.

When the signal behaviour profile is known then logical rules are applied to decide which of the asset dynamics are active at a given point in time. The logical rules can vary for different signal behaviour profiles. Once the combination of active asset dynamics is known for a given datapoint or dataset then a suitable category can be assigned. There may be a category associated with each possible combination of active asset dynamics. An indication of the category is stored in the compact database along with statistical data relating to the dataset.

The compact database is effectively a compressed form of data showing the information of interest in the original data but requiring much less data as a whole since time intervals in the original data are represented by statistical information. Thus, a greater amount of historical/recorded data can be kept and processed with much less of a burden on the amount of data storage and data processing capability that is required.

The information in the compact database enables various further steps, for example identification and adjustment of simple data driven linear or quadratic input-output models within several model-based application areas. Such models can provide representations of aspects of the flow network and allow for a prediction of how proposed changes to control variables will affect the performance of the flow network. Based on the latest information added to the compact database, the input-output models of the applications are continuously updated.

Production improvement is a type of high-level application. While conventional optimization strategies utilize advanced simulators and aim for the globally optimal solution immediately, the information in the compact database can be used to build local input-output models, with emphasis on derivative information. These models can either be purely data driven, or they can be augmented by first order physical models such as conservation laws (e.g. conservation of mass). This model can then be used to optimize the production in a neighbourhood around the current operating point, in order to provide a new and improved operating point.

The use of continuous parameter estimation and model calibrations also enable other model-based applications that would otherwise be cumbersome or subject to large errors. For instance, rate estimation and/or gas-oil ratio (GOR) and water cut (WC) approximations can be made possible due to better accuracy in well-related information (and up to date choke models). This enables effective estimation/calculation of parameters that until now could only be performed by building a parallel and separate test production system or by closing one well at a time.

Figure 2:
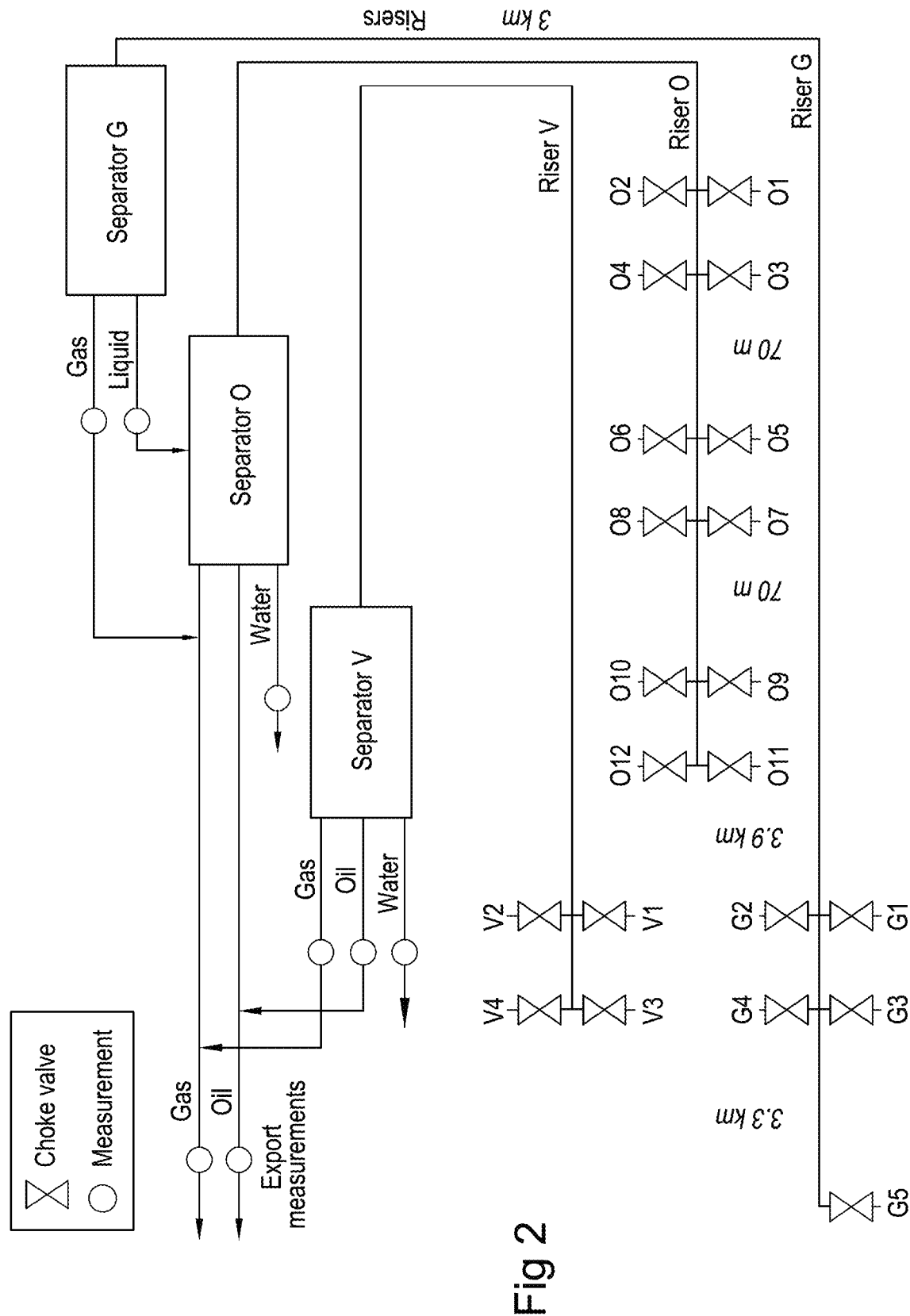
FIG. 2 shows an example flow network, which takes the form of an oil and gas production system.

The main features of an example system using an oil and gas production network can be seen in FIG. 1. A production engineer sets control variables for the network. At step 1, operational changes and/or experiments result in excitation of the system and changes to the asset dynamics. The proposed system uses already installed equipment and software in the production system to obtain data from sensors and pass this data to a real-time database in steps 2 and 3. It will be appreciated that whilst the Figure shows choke values from three wells there could in fact typically be a much larger number of wells and other data as well as choke values could be recorded, for example flow rates, pressures, gas lift and so on. FIG. 2 shows one example of a more complex flow network. Steps 1 to 3 in FIG. 1 involve equipment that may already be installed as a part of the oil and gas production network.

Algorithms, which are elaborated on below, are used to continuously evaluate the real-time database and store statistical data in a compact database at step 4. The continuously updated content of the compact database enables automated input-output model identification and tuning between steps 4 and 5, for example to obtain local optimisation models, local parameter models and local production rate models. Some of the possible applications of such input-output models are shown at steps 6a and 6b, and may include production optimization, parameter (GOR, WC) estimations, rate estimations and test generation. Test generation refers to suggestions for oscillation tests and/or step changes with the purpose of enhancing the information content in the data stream. Other changes might be proposed for the purpose of improving the performance of the system. The data in the compact database can also be used for other purposes, such as for allowing searching of past data for specific events or combinations of events.

The applications for the method shown in FIG. 1 can be split into applications based on the compact database, as in step 6a, and applications building on top of the local models as in step 6b.

In step 6a, the following possibilities are shown:

Data Aggregator

This enables exportation of all or parts of the aggregated information database to, for instance excel or other software. This might be done for all previous production configurations, average values and other statistical information for all relevant measurements could be exported to excel for further analysis. Compact data could also be exported, for example for tuning of model parameters in e.g. simulation software such as GAP, K-Spice++.

Well Test Optimizer

Wells are normally tested by using a dedicated test flow line with an associated test separator. During such well tests the production engineer may monitor the statistical information for the current steady-state interval, and the updated uncertainty and stability information can be used to dynamically decide upon the optimal length of the well test. It is possible to use the steady state analysis to find out when stability and uncertainty of cases has reached acceptable levels and hence to finalize the test automatically.

Deduction Test Optimizer

Subsea wells without a dedicated test flow line are normally tested by deduction well testing. This means that the test well is shut-in, and the resulting change in the common flow line is used to calculate the contribution from the test well. The production engineer may monitor the statistical information for the steady-state intervals before and after shut-in in order to make certain that the quality of the information is sufficiently high and to optimize the time a well is shut-in. Both during the pre-shut-in and the shut-in interval, one can in real time update the statistics on the steady state interval as time goes and new data is available. This real-time statistics for both steady-state interval might be used to decide when to shut it in, and when to turn it on, so that the test is as short as possible, but with acceptable uncertainty in the parameters.

Assessment of Production Settings

Data from the compact information database may be used to visualize an overview of changes/differences between to different steady-state intervals or production settings. Such visualization may bring up relevant information, and reduce the need for manual inspection in an historian database. Further, this application may be used for assessing the effect of the last change made to the control points, in real-time (In somewhat the same way as for the deduction test optimizer application). Due to the fluctuations in the production data, it takes time to determine the effect of a change to the control points with acceptable degree of certainty. The statistics extracted from the last time interval, i.e. the interval from the last change in the control points until now/current time, can be updated and recomputed continuously in real-time with new data, as time goes. By doing so, one typically gets better flow parameters estimates with less uncertainty as time goes by. By comparing the continuously updated statistics of the current time interval in the data during which the control points and the flow parameter(s) are in a steady state, with the previous time interval, or any earlier time interval, one can in real-time assess the effect of a change in the control settings. Given that the change in the control points had a bad/non favourable effect on the oil and gas flow network, this application should enable one to conclude earlier than with current solutions, and hence reduce the time in which the production system is performing non favourable.

Production Search Engine

The compact data base can be made available via a suitable search engine in order to enable a production engineer to search in the compact information data base for certain settings, behaviours or events.

Data Driven What if Studies

The user can easily explore the production system's response to changes in control settings by looking at the historical information contained in the compact database.

In step 6b, the applications shown in the Figure are:

Constraint Balancing

Local models are built on top of the compact database with the aim of balancing between different constraints on the system. This means that one bottleneck/constraint is addressed at a time in order to provide a simplified approach to optimization. For example, production wells can be ranked based on their ratio contribution to the objective (for example, whatever should be maximized) compared to the contribution to the constraint (for example, whatever bottleneck limiting the production).

Production Optimization

Local models are built on top of compact database with the aim of optimising production. This means that multiple bottlenecks/constraints are considered at the same time.

Well Health

The local models can be utilized for auto detection of abnormal outliers based on the information in the compact database. For example, the algorithm may detect if e.g. pressures and temperatures are moving outside of "normal" behaviour i.e. not matching historical behaviour.

Production System Test Generation

The compact database can be used to compute optimal experiments, i.e. changes to the controls, so that the compact database can augmented with new and complementary data. The intention would be that the other applications will have a better and richer data foundation, e.g. that the estimates on GOR is improved, or the local input-output model has less uncertainty in its parameters.

The production engineer receives recommendations from steps 6a and 6b and can choose to implement appropriate adjustments to control variables for the production system. Such changes then become new excitations at step 1 for a repeated cycle.

By way of an example, the proposed method will be described in more detail below, with reference to an oil and gas production installation. A producing asset typically consist of numerous wells producing to several manifolds/headers both subsea and topside, and each subsea manifold further directs the flow to the topside through one or several riser pipes.

Sometime topside wells can be routed to one out of several topside headers. Furthermore, subsea wells producing to a subsea manifold can sometimes be routed to one out of several risers connected to that manifold. For other configurations a well is always producing one particular header or riser during normal production.

Some of the discussions below are supported by reference to a particular system as depicted in FIG. 2. This example production system has six manifolds distributed across three risers V, O and G. Riser V has one manifold with four well slots V1-V4. Riser O has three manifolds each with four well slots O1-O4, O5-O8 and O9-O12. On Riser G there is one manifold with four well slots G1-G4 and one manifold with one well slot G5. In this example the manifolds at Riser G mainly have gas wells, while the remaining manifolds have more oil rich wells.

There is a separator at the end of each riser. During normal production the flow from the gas wells at manifold G1-4 and G5 are led through Riser G to Separator G, the flow from the oil wells of manifold O1-4, O5-8 and O9-12 are led through Riser O to Separator O and the flow from the wells of manifold V1-4 are led through Riser V to Separator V. All measurement points for the system are marked in FIG. 2. Separator G has gas and liquid measurements, Separator O has a water measurement and Separator V has all three measurements gas, oil and water. In addition, two export measurements measure the total oil and gas production from the entire system.

Huge amounts of raw data is generated about production systems such as oil and gas production systems. A continuous stream of data from the control system and sensors are being passed to real-time databases and stored. However, the data typically contains measurement noise, peaks, transient periods, system fluctuations and other unidentified effects making it challenging to extract the essence in the data by eyesight. Thus, for most oil companies the majority of this data are left unused.

The proposed method processes the available data about a production system to collect relevant information and generate a compact high quality information database. The data about the production system is stored in a real-time database. The data may be enriched by an "observer", i.e. a simple calculation or the like that can provide virtual measurements to add to the real-time data. Together all this data, which hence may include historical (previously obtained) data, as well as real-time (live) data, forms a data source. Note that older data, gathered before implementation of the currently proposed process, can be used just as well as newer 'fresh' data, for example data gathered whilst this process is on-going and providing input on changes to the operation of the system.

An algorithm identifies appropriate time intervals, categorises the data in those time intervals and then analyses and calculates high quality statistical information based on the data source and stores it in a new compact database, which is a compressed representation of the original data. The process will be automated, thus the live data streaming into the real-time database will be continuously evaluated and new information added to the compact database.

The number of information sources (sensors) varies between production systems. The information sources can be categorized into two types, control signals and output measurements. Control signals might normally include choke positions, gas lift rates and routing settings. These controls can be directly adjusted by an engineer and according to changes made to them the output measurements will change. Normally, pressure and temperature sensors are present in the bottomhole and at the wellhead of the well and at each end of a riser pipe. A production system often has one of several separators, separating the flow into oil, gas and water at a fixed pressure. The production gathered in a separator may stem from riser pipes, topside wells or both. During normal production rate information is only obtainable after separation and thus usually only for several wells together. However, after a regular well test it is common to find well specific production rates. During a well test, the well is either closed down and the difference in total production before and after is measured, or the well is routed to a test separator were the well specific production rate is measured.

The data basis can be enriched by virtual measurements found through simple calculations or "observers", before complex mathematical and statistical analyses are performed on the data. Several types of calculations or observers can be utilized; such as mass balance equations, choke models and Kalman filters.

Mass balance equations: when the topology of a production system is known, mass balance equations can be utilized to create virtual measurements for single phase production steams that are not measured. For this to be possible, enough other flow measurements must be present for the system of equations to have one possible solution. Such a situation exists for the production system of FIG. 2. Consider the total oil flows which are gathered in a joint export flow. A more advanced observer calculates the oil and water flow from riser G given the liquid and gas measurements out of separator G. This further enables calculation of oil and gas flow from riser O, through mass balance equations. Thus, virtual measurement are created for the oil and water flow from Riser G and oil, gas and water flow from Riser O. If the time offset is an issue between measurements, this should be taken into account in the mass balance observer equations.

The use of mass balance equations to create virtual measurement for multiphase flow should also be possible, however certain requirements must be satisfied. Pressure and temperature conditions must be similar for all the measurements and the hydrocarbon compositions in the joint streams must be identical.

Choke models: such models can be used to estimate the production rates through a choke of a well. A choke model typically takes measurements such as pressures and temperatures around the choke as inputs, and returns estimates for production of oil, gas and water rates through the chokes. However, choke models are complex. In addition the models typically need information on certain fluid characteristics and so on, which is not always available. Variations of the models should be used based on whether the flow is incompressible or compressible and subcritical or critical. If a choke model and the necessary measurements and information are available, virtual measurements for the well specific production rates can be created.

An example can be given for the production system in FIG. 2. An observer is used to calculate the topside measurements that are missing in order to get full overview of the phases produced form each riser. The observer calculates the oil and water flow from riser G given the liquid and gas measurements out of separator G. This further enables calculation of oil and gas flow from riser O, through mass balance equations. In other words the boundary conditions for each of the risers with their connected wells are fixed, i.e. there is a fixed pressure in the reservoir and in the separator and there is information about oil, gas and water flow at the outlet of each riser. Thus, the three risers with connected wells can be regarded as three different isolated subsystems and e.g. autonomous system models can be built for each riser.

In this context the data source means the data basis used for generation of the compact database. This means all the historical and live data available for all control signals, all output measurements and all possible virtual measurements computed by the observer, e.g. flow rates from a riser that is not measured. The data from the data source is processed by the database mining algorithms in order to produce the compact database.

The database mining algorithms transform large amounts of data for real and virtual measurements into compacted data containing only relevant and important information. Several different database mining algorithms are described herein, including a steady state absolute extraction algorithm and a steady state derivative extraction algorithm. These algorithms may identify and categorise datasets where the data relates to a category concerned stable production. Datasets in other categories may be identified and categorised by further features of these algorithms, or by routines embodied in separate algorithms. The algorithms analyse data for relevant control signals of the production systems to map intervals of certain specifications. They can use asset dynamics as described herein in order to categorise the data in the time intervals. For all time intervals statistical or derivative information about relevant output measurements are calculated. If the production system consists of two or several subsystems, such as two subsystems separated by a closed valve, then the algorithms are run for each subsystem.

Some systems can be divided into several subsystems with fixed boundary conditions. Fixed boundary conditions means fixed pressures at all boundaries and rate measurements at all boundary outlets. The first condition ensures that pressure changes within the subsystems don't interact, which means that production rates from a subsystem are only affected by changes made to the control signals of the subsystem. The second condition ensures that total production rates from the subsystem are known at all times. The boundary conditions are either given by real measurement or virtual measurements found by means of an observer. An example of such a subsystem is a group of wells producing to a given riser pipe directing the flow to a separate separator. The boundary condition is given by rate measurements out of the separator and the fixed pressures in the reservoir and at the inlet of the separator. If it is possible to divide the system into several isolated subsystems, it can be beneficial for the purpose of production optimization, parameter estimations and other computations.

The steady state extraction algorithm maps time intervals of absolute steady state production. By absolute steady state production we mean that all control variables for the subsystem of interest have been kept stable. For each interval, statistic information about relevant output measurements of the subsystem is found through statistical analyses. The steady state derivative extraction algorithm maps time intervals of induced oscillations or other step changes to the control variables for the subsystem. An interval is only of interest if steady state derivative information is available but steady state absolute value information is not. This means that derivative information cannot be found through finite difference. Thus, for each such interval, the derivate information is found through frequency analysis.

The information about one interval is called a case. Two types of cases are defined, the steady state (absolute) case and the steady state derivative case. For each respective subsystem there is one table which saves all steady state cases and one data table which saves all steady state derivative cases. For each run the two algorithms maintain the data table of the respective subsystem and add new cases. On a first run the algorithms evaluate all available historical production data. Subsequently, the algorithms will be continuously running to evaluate the new live data available through the data source and amend new cases "on the fly". The new live data might be augmented by the addition of new observers compared to older historical data. Both of the algorithms are implemented in two steps where step one identifies intervals for data to be collected and step two collects the relevant information from the chosen intervals.

Given a data source of real and virtual measurements from a dynamic subsystem, a steady state case is found by analysing steady state intervals and extracting relevant statistics. Identifying a steady state may require that all control points are kept stable, for example with no changes to the settings for the control points. Although the control points have been kept stable the flow parameters could still be in transition. Furthermore, if there are variables not encompassed by the status of the control points, and one of these variables changes and impacts on the flow parameters, then the system would be deemed not to be in a steady state. Identifying a steady state interval may require that that the expected value of the relevant flow parameter(s) should not change considerably with time during this interval. Identifying a steady state interval may alternatively or additionally require that the relevant flow parameter(s) originate(s) from (a) weakly stationary process(es), such that the moments up to the second order depend only on time differences. Among other things, the latter requirement means that the expected value of the flow parameter(s) should not change considerably with time during this interval.

For a given stochastic process $X=\{X_t\}$, its autocovariance function is given by $\gamma_x(s,t)=\text{cov}(X_s,X_t)=E[(X_s-\mu_s)(X_t-\mu_t)]$, where $\mu_t=E(X_t)$ is the mean function, for time t and s. In the case of white noise, $\gamma(s,t)=0$ for $s \neq t$.

We say that a process is weakly stationary if:
a) the expected value $\mu_t$ is constant and does not depend on time, and
b) the autocovariance function $\gamma_x(s,t)$ depends on s and t only through their difference $|s-t|$.

In an example method, determining if a flow parameter does not change considerably with time for a given time interval may including fitting linear and quadratic lines to all the data points for the flow parameter during the interval. The linear line will have a constant term and a linear term. The quadratic line will have a constant term, a linear term and a quadratic term. The linear and quadratic terms and/or lines may be used to determine if the flow parameter can be deemed steady state.

This means that if the flow parameter holds values that oscillate around a certain expected value throughout the interval, i.e. if the total interval were to be divided in for example two intervals, then the expected values for each small interval would be approximately equal to the expected value of the total interval. If the flow parameters have measurements values with noise that oscillate around an expected value that is changing during the interval, the interval is not defined as steady state. If no significant/noticeable variations are detected in the well and production system output measurements during the interval, it is identified as a steady state interval and saved to the steady state case data table. If the well specific control signals have been stable for a sufficiently long time, the output signals produced during this period are evaluated. Then statistical analyses are run over the sample points for all relevant signals. Typical information saved to the steady state case is general information about the intervals such as start time and duration and statistical information for each signal/measurements such as mean, median, variance, constant term, linear term, r-squared, number of sample points. If a well is put on test at a parallel test production system during this interval, statistical information from the production related output measurements for this well is also part of the information saved to the steady state case. The case is added to the steady state data table of the subsystem. An example is described below with reference to FIGS. 3 and 4.

Given a database of measurements from a dynamic subsystem, a steady state derivative case is found by analysing intervals where controlled changes have been induced to the system controls and relevant derivative information is extracted. A steady state derivate case is defined for time intervals where some subsystem control signals have been oscillated/changes and all remaining control signals have been kept stable. The information is only saved to a steady state derivative case if derivative information is available for but steady state absolute value information is not. An example is oscillation tests. During such tests, intended and timely changes at regular frequencies and fixed amplitudes are introduced to one or more control signals while all other control signals are kept stable. Absolute value steady state information about well specific production rates are not available in the measurements, however frequency analysis can be run over the data to collect derivative information (i.e. gradient information) about the well specific production rates. Typical information saved to a steady state derivative case is general and derivative information about the interval. The general information is start time and set point values of all control signals. The derivative information entails from which control signals to which output measurements there exist derivative values, and what they are with uncertainty values. The case is added to the steady state derivative data table of the subsystem The two data mining algorithms are given below. Both algorithms are formulated for being applied to historical data, however they may also be run on live data. The derivative/gradient extraction is given for oscillation experiments only. This is because oscillation experiments are only situation we know of at this point which provide derivative information about well specific measurements when absolute value information is not available.

Database Mining Algorithm: Steady State Extraction.

This algorithm has two steps. The first step creates the intervals for which statistical information should be collected, the second step collects the statistical information.

Step 1: Interval Creation

To find a list of intervals where statistics should be collected there are two approaches. The first is to divide the timespan in equally sized sub-intervals (Alt. 1). These intervals may for example be between 1 and 24 hours long, typically they would be 2 to 6 hours long. The second (Alt. 2) is to first identify all step changes applied to the system and remove regions where transients are highly probable.

Alt 1: Fixed Length Partitioning

Define the start time, end time and the ideal length of the sub-interval. Based on this information the algorithm computes the number of intervals, and the length of each interval.

Output: All intervals are given with start time, end time and interval duration.

Alt 2: Transient Aware Partitioning

Define the start time, end time, the ideal length of the sub-interval, the minimum interval duration, the settling time needed for the system to stabilize after a step, the time to remove at the end of a stable interval and the set of piecewise constant signals. Based on this information the algorithm identifies the regions where transients are highly probable, these regions are removed from the dataset. Alt 1 is used to partition the remaining regions in the dataset.

Output: All intervals where all control signals have been kept stable during the entire interval are given with start time, end time and interval duration.

Step 2: Statistic Collection

For each interval found in step 1 the desired information and statistics are found. The general information about the intervals is start time, end time and duration. In addition, statistical information is generated per signal. For one such signal statistical information for the given signal/measurements such as mean, median, variance, constant term, linear term, r-squared, number of sample points is obtained. If the linear term is sufficiently small (approx. 0), i.e. the linear line is approximately parallel to the time axis, then the flow parameter is not in transition. In this case, the information found for the interval is added to a case, which is saved to the steady state case data table of the appropriate subsystem.

Output: One table with interval information and one table per signal with statistical information related to each interval.

Database Mining Algorithm: Derivative/Gradient Extraction from Oscillation Experiments This algorithm has two steps. The first step detects/create the intervals for which statistical and derivative information should be collected, the second step collect the derivative and statistical information.

Step 1: Interval Detection

This step evaluates the control variables (wellhead chokes and gas lift chokes) in order to identify intervals in the data where excitation experiments have occurred.

Define the start and end time of the search. Define the minimum number of periods and the maximum variation in amplitude for an excited control variable. Typically a minimum of two periods may be required. Maximum amplitudes may be set at perhaps 15% of the range of the control variable (e.g. 15% of choke opening), with typical values in the range 0.5-5%.

In addition, the following requirements must be fulfilled for the interval to qualify as an excitation experiment:

1. Each excited control variable has been
   Changed in a sinusoidal-like pattern, through step changes or oscillations
   Excited for a minimum number of periods
   Excited with an amplitude that does not vary more than the defined maximum
2. All excited control variables are excited at different frequencies, but with the same start and end time
3. All other control variables have been kept stable during the interval Based on the information and requirements the algorithm identifies the intervals where excitation experiments have occurred.

Output: All excitation experiment intervals are given with start time, end time and duration.

Step 2: Collection of Derivative Information

For each interval found in step 1 the desired generic information is collected together with derivative information. Frequency analysis, e.g. a Fast Fourier Transform, is run over the data of each interval to collect derivative information about the well specific production rates. The general information is start time and set point values of all control signals. Derivative information is provided for the control signals and the output measurements. The information provided for the control signals indicate in which direction the derivative values are provided for i.e. which control signal direction. Given this derivative direction, the resulting derivative values are provided for each output measurement. The derivatives for each output measurement are provided with uncertainty.

Output: One table with interval information and one table per signal with statistical information related to each interval.

EXAMPLE 1A: GENERATION OF STEADY STATE CASE DATA TABLE

Figure 3:
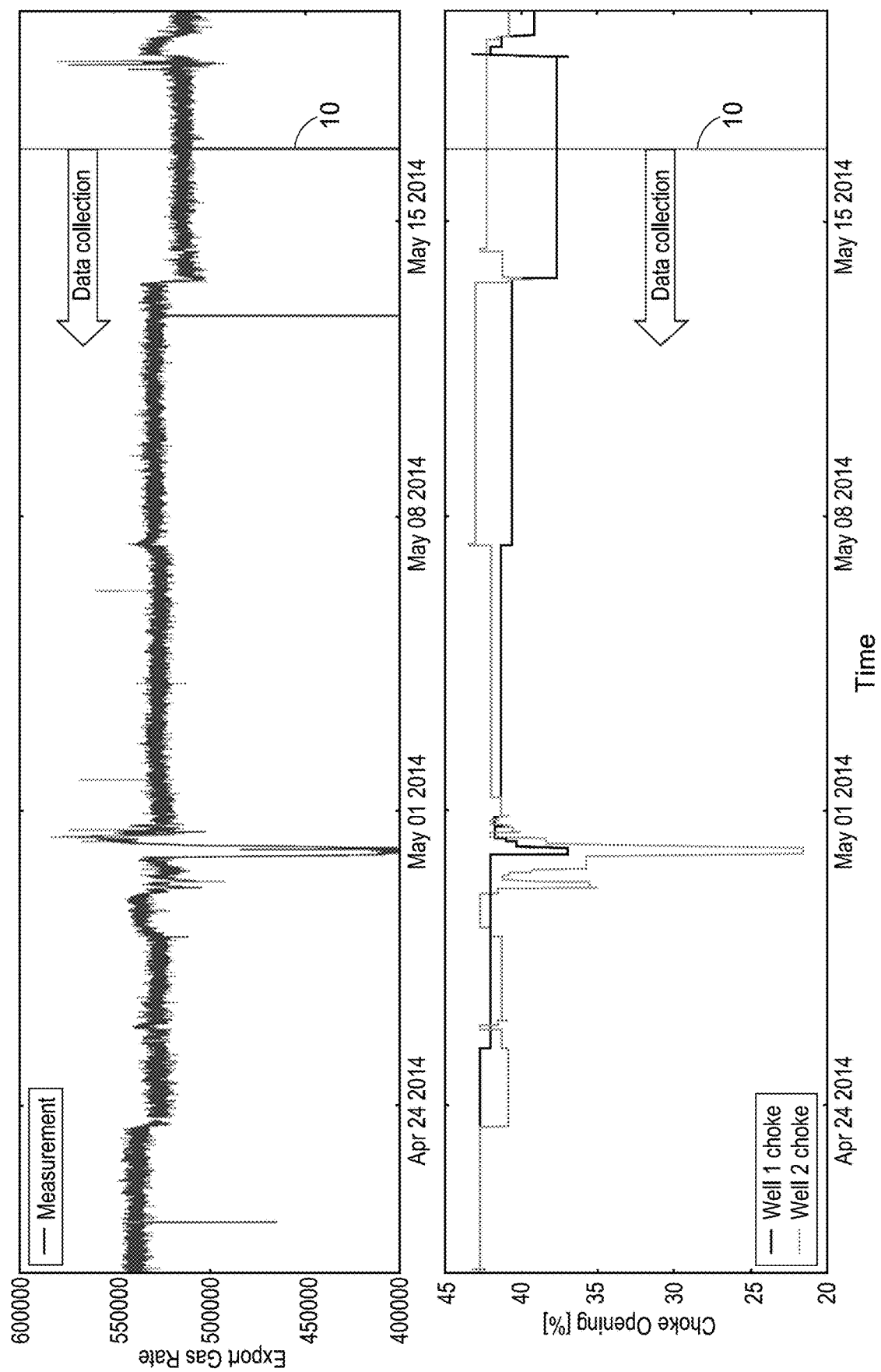
FIG. 3 is a plot showing one month of measured data of export gas rate and choke valve settings for two wells in the production system of FIG. 2.

A steady state case data table was generated for production system of FIG. 2. For this specific example, one month of data from the real-time database is utilized to build the case data table with cases which includes data for one output measurement, the gas export, and two control signals: the chokes of the wells G1 and G5. FIG. 3 shows the data set that is utilized. This is real production data in the period of 20 Apr. 2014-20 May 2014. The top plot shows the gas export measurement, and the bottom plot shows the choke settings of G1 and G5 during this period, called well 1 and 2 respectively throughout this example. There have been no changes in the chokes of the remaining wells of the subsystem during this time, which is why one can disregard all these wells throughout this example.

Figure 4:
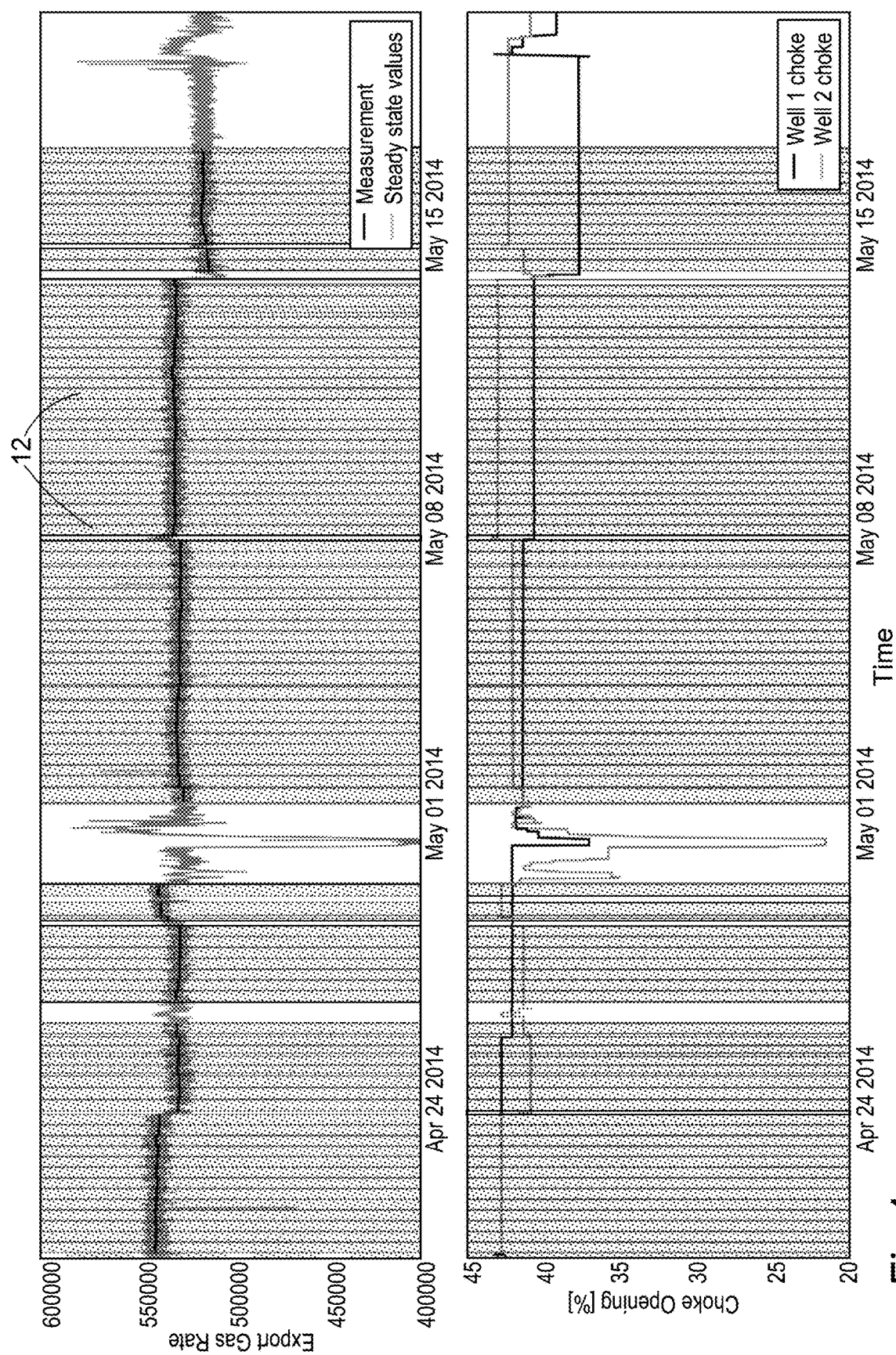
FIG. 4 illustrates identification of intervals of stable production data in the data of FIG. 3, in accordance with an example optimisation system.

The data to the left of the vertical line 10 was used for data collection and generation of a steady state data table through the Data mining algorithm: steady state case extraction. The steady state case intervals found though Step 1: Interval creation of the algorithm is illustrated in FIG. 4. The intervals are the various regions 12 separated by the vertical lines. It will be note that where there are changes in the control variables, i.e. adjustment to the chokes for wells 1 and 2 then there are no steady state intervals. For each such interval the Step 2: Statistics collection of the algorithm calculates statistic information about the gas export measurement and the control signals of well 1 and well 2. The information is saved as cases in the steady state case data table. Table 1 represents a small extract of the resulting steady state case data table. For case 1 the statistical information for the gas export measurement and the control signal of well 1 is provided.

TABLE 1

Steady state case data table

| | General information | | | Statistical information | | | | | | | |
|---|---|---|---|---|---|---|---|---|---|---|---|
| | | | | Nr. of samples | | | | | | OLS | number of bad |
| Case | Start | End | Dur. | points | Mean | Median | Var. | OLS a0 | OLS a1 | r-squared | values |
| 1 | 15.06.10 18:53 | 15.06.11 00:53 | 6 h | | | | Gas export measurement | | | | |
| | | | | 30924 | 541570 | 541570 | 67.56 | 541570 | 0.01 | 0.0001 | 1 |
| | | | | | | | Choke well G1 | | | | |
| | | | | 75 | 43.1 | 43.1 | 0 | 43.1 | 0 | 0 | 0 |

Table 2 shows the structure of a typical steady state derivative case data table of the type that could be generated for similar data to that shown in FIGS. 3 and 4. The general information is start time and set point values of all control signals. Derivative information is provided for the control signals and the output measurements. The information provided for the control signals indicate in which direction the derivative values are provided for i.e. which control signal direction. Given this derivative direction, the resulting derivative values are provided for each output measurement. The derivatives for each output measurement are provided with uncertainty.

tions are also possible, as shown in FIG. 1. The applications utilize data from the compact database to build local input-output models, with emphasis on derivative information. The four model based applications are:

Production optimization
Test generation
Parameter (GOR, WC) estimation
Rate estimation
Production improvement is a type of high-level application. Rate estimation and/or GOR and WC approximations can be made possible due to better accuracy in well-related information (and up to date choke models).

TABLE 2

Steady state derivative case data table

| | | Derivatives | | | | | | | | | | |
|---|---|---|---|---|---|---|---|---|---|---|---|---|
| Time for test | Set point | From control signals | | | | To measurements | | | Uncertainty | | | |
| Start | u* | $u_1$ | $u_2$ | ... | $u_n$ | $y_1$ | $y_2$ | ... | $y_m$ | $y_1$ | $y_2$ | ... | $y_m$ |
| 15.06.10 18:53 | $(u_1, u_2, \ldots, u_n)$ | 0 | 1 | 0 | 0 | 2.5 | na | na | na | 0.5 | na | na | na |
| | | 1/root(2) | 1/root(2) | 0 | 0 | 1.1 | 3.1 | 0 | 0 | 0.4 | 0.6 | 0 | 0 |

Two types of data tables have been defined, steady state data tables and steady state derivative data tables. The number of data tables of each type is decided by the topology of the production system. For each possible subsystem of the production system, one steady state data table and one steady state derivative data table may exist. All data tables are saved to the compact database.

A steady state data table for a subsystem saves steady state cases for the respective subsystem. A steady state case is defined for time intervals where subsystem control signals are kept fixed and all other subsystem measurements are stable. The information about a case is saved in one row in the data table.

A steady state derivative data table for a subsystem saves steady state derivative cases for the respective subsystem. A steady state derivate case is defined for time intervals where some subsystem control signals have been oscillated/changes and all remaining control signals have been kept stable. The information is only saved to a steady state derivative case if derivative information is available but steady state absolute value information is not. The information about a case is saved in one row in the data table.

The compact database serves as data foundation for four model-based applications in this example. Other applica- When an application is initiated certain information is required: 1) the problem description, i.e. which application, the relevant parts of the production system, relevant control signals, output measurements and 2) the operational point of interest given 1. The details are defined by a user though a GUI or by the application itself through a scheduler/trigger. Based on this information, all relevant case data within a specified trust-region around the operating point, or based on other selection criteria, are gathered from the appropriate data tables in the compact database by the CDB crawling/scanning algorithm. The data is sent to the model building algorithm, which identifies the relevant input-output models to be built given the data (steady state cases/sample set). Simple linear or quadratic input-output models valid within the trust-region are then built through regression techniques. Either these models can be purely data driven, or they can be augmented by first order physical models and conservation laws (e.g. conservation of mass).

The resulting input-output models are are combined using the structural information in the problem description. The complete model is then utilized in an algorithm to provide some application specific output. General features that are common for all applications will be described in detail below in light of the production optimization application and test generation application. This explanation is formulated specifically for those two applications together. However, in principle it applies to all four applications and can very easily be rephrased to apply to all.

Information about the production system topology, the operational point of interest and the optimization objective, constraints, and variables, are taken as inputs to the approach. When the production optimization application is initiated certain details are defined: 1) the problem description, i.e. which parts of the system one wants to optimize and the objective, constraints and variables and 2) the operational point of interest-. Details may be defined by a user of the application. Based on this information the relevant variables and necessary input-output models are identified.

Based on the problem description, all relevant data within a specified trust-region around the provided operating point are gathered from the appropriate data tables in the compact database. Simple linear or quadratic input-output models valid within the trust-region can then be built using a regression method. The data-driven models may be augmented with first principles (e.g. conservation of mass) for improved predictive capabilities. Either these models can be purely data driven, or they can be augmented by first order physical models and conservation laws (e.g. conservation of mass).

The objective function and constraints are combined with the resulting input-output models in a local optimization model. This model can then be used to optimize the production in a neighbourhood around the current operating point, in order to provide a new and improved operating point. An optimization algorithm is then run to obtain a suggestion for an operational change that may improve production. There are three important differences between this approach, and common state-of-the art approaches. 1) Unlike traditional optimization methods, this method is a production optimization approach that focuses on smaller, stepwise improvements of production rates, rather than a single large step towards an optimal solution. This is a major difference from conventional optimization approaches within petroleum production optimization and makes it a more robust and acceptable online production optimization concept than a conventional optimization approach. 2) Just as important, since the optimization problem we seek to find the best possible solution to is "steady state". Meaning that for the time horizon of the decision (e.g. 12 hours to 2 weeks), the reservoir conditions can be considered fixed i.e. modelled by a constant PI, GOR and WC for each well, and the dynamics of the pipeline system can be neglected and considered steady state. The production data can be compressed (something like) 99%-99.99%, into the aggregated steady state cases (steady state samples) in the CDB. The CDB then contains the (aggregated and compressed) information in the production data, which is relevant for the steady state production optimization problem that this technology seeks to solve/optimize. 3) Instead of an (production) engineer initiating an optimization workflow, the system optimizes in the background, and presents the solution when the potential benefit of changing the system into this new operating point, exceeds a certain threshold. i.e. instead of a person actively deciding to conduct an optimization, this is done automatically, and an optimized solution is only presented when it potentially could result in improved production.

The initiation of the optimization application is done through two different channels. The first is a trigger or scheduler. The trigger starts the optimization application due to either new data e.g. new data in the compact database or a new current operating point or according to time settings e.g. time since last optimization or some kind of time schedule. The trigger does not have the same understanding of the problem as the people actually operating the production system. This is why the second channel, the GUI, is an important option. In this case an interested user initiates the optimization application, probably for small variation of what the trigger have already optimized on or for a different operating point.

In order to initiate the optimization application for the wanted optimization, two types of information about this particular optimization are required. 1) Information about the production system (e.g. subsystems and wells) and 2) information about the optimization problem (e.g. objective function and constraints). This enables identification of relevant measurements and decision variables, and thus identification of essential input-output models.

The most common and intuitive optimization options are saved inside the trigger. An optimization option specifies which subsystems and wells to optimize for and for which objective function and constraints. According to the new data and the time a specific optimization option will be initiated.

The interested user may tailor the optimisation by varying the combinations of subsystems and wells and objectives and constraints.

EXAMPLE 2

The engineer wants to optimize the production from Riser G and Riser O of the production system of FIG. 2.
The objective is to maximize total oil production, while complying with the gas handling capacity.
Necessary Variables
Oil and gas production for Riser O
Oil and gas production for Riser G
Choke settings for all wells
Required Input-Output Models
Oil and gas production for Riser O given changes in choke settings for wells in Riser O
Oil and gas production for Riser G given changes in choke settings for wells in Riser G The optimization application is dependent on getting an operating point as input, in order to be able to choose the right data for model building and in order to run optimization. An operating point defines the centre of the region for the data selection and the model building, and the starting point in terms of the optimization. In most cases, the operating point will hold information about the current production subsystem settings. However, in some situations it might be some other production subsystem settings than the current, i.e. a virtual operating point.

Each time the production settings are changed, a new current operating point can be obtained. After all measurements have stabilized, the necessary information about stable production is then found through algorithm 1. Other algorithms may be used to find relevant information about other categories of data, such as data relating to transient events.

A virtual operating point may be desirable if e.g. an engineer is planning to change the production settings soon, and want to optimize around these settings before the change is done or if the optimization algorithm e.g. are to propose re-routing (which is a large change). In the latter case, it might be difficult or impossible to extrapolate far enough with the local model built around current operating point. Thus, new/other local models based on old data, i.e. a virtual operating point, should be built for the way the system will (probably) become when a re-routing is performed.

The simple models are identified and built from a combination of data extracted from the compact case database. The case selection algorithm (2) searches the compact data base for all the relevant cases, and from each case it copies only the relevant information for the given application.

In the problem description, the objective function, constrains and variables are given. From this, it is clear for which subsystems information is required and for which output measurements it must be built models. The given operating point and the trust region are the main factors for determine which cases are relevant. E.g. for one particular subsystem all cases that lie within the trust region cantered at the operating point are selected. The data for the essential output measurements and for the input control variables are copied from each case.

The trust region can be defined in several different ways, the main point of the trust region is that cases for which data are extracted resembles the operating point in some specified dimension, e.g. the control variable values or some output measurement values. A trust-region may be specified by e.g.:
1. Max distance between choke values of a case and of the operating point, per well or in total
2. Max difference in total riser production of a case and of the operating point
3. Max difference in riser pressure of a case and of the operating point
4. Etc.

Compact Database Crawling/Scanning/Algorithm: Case Selection.

This algorithm is run for each related subsystem specified in the problem description. Based on the CDT(s) for the subsystem, the algorithm generates a temporary data table with relevant case information from Step 1 and 2.

For each essential/relevant subsystem, complete step 1 and 2.

Step 1: Identification of Cases that Lie within the Selection Region

Each case in the CDT(s) of the subsystem is evaluated using the selection region as basis for comparison. If a case lies within the boundaries of the selection region, the case is marked/remembered by the algorithm as important/relevant.

Step 2: Generation of Temporary Simplified Case Data Table

A temporary simplified case data table is created. Information about all the cases marked/remembered as relevant/important are here saved. Information is saved for all input signals, but only for the relevant/essential output measurements specified in the problem description.

Output: One temporary simplified case data table for each participating subsystem Building of Input-Output Models Through Regression Algorithm In order to optimize the production system, models that describe the system behaviour are required. The properties of such system models and how they are built are discussed below. The optimization problem description provides information about the objective function, constraint and variables, the operating point is found and all relevant data are extracted/copied from the CDB by the case selection algorithm (2). The next step in the optimization application is to use this information to build the local input-output models needed to run the desired optimization.

A system model or an input-output model maps some subsystem output measurement to all or some input signals of the subsystem. E.g. an input-output model that estimates total oil production from the oil riser subsystem, depending on choke settings for all wells of the subsystem. All data need to build the models are passed from the case selection algorithm (2). The model building algorithm recognizes which models should be built based on this data. The total number of input-output models that should be constructed is determined by the number of subsystems and the number of output measurements per subsystem for which information is contained in the data.

A typical input-output model is given by equation (1) below. $q_o(u)$ would denote the linear model for e.g. total oil production given all control signals $u_i$ for the total number of n control signal. The models are built through regression techniques. The structure of the model for one particular measurement depends on the number and geometry of linear independent cases/samples provided by the case selection algorithm for that particular measurement/output. The resulting model will be a linear model built for either all or some control signals. The model can be purely linear, or it might include some curvature. If curvature is included, the nonlinear terms are either quadratic terms or terms from first order physics, in some situations it is both. When the structure of the model has been determined, the parameters $a_{oi}$ for all n control signals and the parameter $b_o$ must be found through regression on the t number of cases, each case provide a total oil production measurement $q_o^*(u^{*i})$ for a given configuration i of the chokes $u^{*i}$. Given all the available cases, a linear system of equations can be formulated and all parameters $a_i$ for all n control signals and b in model (1) can be found through regression.

$$q_o(u) = a_{o1}u_1 + a_{o2}u_2 + \ldots + a_{on}u_n + b_o \quad (1)$$

$$\begin{bmatrix} u_1^0 & \ldots & u_n^0 & 1 \\ u_1^1 & \ldots & u_n^1 & 1 \\ \vdots & \ddots & \vdots & \vdots \\ u_1^t & \ldots & u_n^t & 1 \end{bmatrix} \begin{bmatrix} a_{o1} \\ a_{o2} \\ \vdots \\ a_{on} \\ b \end{bmatrix} \underset{=}{OLS} \begin{bmatrix} q_o(u^0) \\ q_o(u^1) \\ \vdots \\ q_o(u^n) \end{bmatrix} \quad (2)$$

The model parameters of (1) are found through regression by means of e.g. ordinary least squares (OLS) for the system of equation (2). OLS is one out of many possible regression techniques for arriving at parameters for input-output models given the data in the CDB.

Another possibility is to build and obtain parameters for a differential input-output model without a constant term, such as the model provided in (3). A shift of coordinates $u-u^*$ is here made so that the current operation point $u^*$ becomes the origin and the constant term lapses. The resulting system of equation becomes as (4). A model-fitting option suited to such a system of equation is e.g. regression through the origin, or RTO for short. RTO also refer to regression obtained by least-squares methods.

$$q_o(u) - q_o(u^*) = a_{o1}(u_1 - u_1^*) + a_{o2}(u_2 - u_2^*) + \ldots + a_{on}(u_n - u_n^*) \quad (3)$$

$$\begin{bmatrix} (u_1^0 - u_1^*) & \ldots & (u_n^0 - u_n^*) \\ (u_1^1 - u_1^*) & \ldots & (u_n^1 - u_n^*) \\ \vdots & \ddots & \vdots \\ (u_n^t - u_1^*) & \ldots & (u_n^t - u_n^*) \end{bmatrix} \begin{bmatrix} a_{o1} \\ a_{o2} \\ \vdots \\ a_{on} \end{bmatrix} \underset{=}{RTO} \begin{bmatrix} q_o(u^0 - u^*) \\ q_o(u^1 - u^*) \\ \vdots \\ q_o(u^n - u^*) \end{bmatrix} \quad (4)$$

Linear input-output models do not capture the potential curvature information of the function or measurement that they are approximating. The quadratic model can be considered the simplest nonlinear model that will capture some curvature. To obtain an overdetermined set of equations a fully quadratic model of a measurement given a set of signals will require more linearly independent cases than the corresponding linear model. Another possibility is the use of linear models with some curvature. Linear models with curvature in some dimensions need fewer cases than needed for a complete quadratic model but more cases than those defining linear models. Typically it would be desirable to construct accurate linear models, and then enhance them with curvature information, if the data suggests that for some dimensions the model should be nonlinear. Minimum Frobenius norm models are linear models with curvature, the building strategy is based on finding linearly independent cases for the linear model and enhancing this model with curvature by including more cases. The method assumes that it is relevant to build models for which the norm of the Hessian is moderate. This is because the error bound depends on the norm of the Hessian of the model. The building of a minimum Frobenius norm model involves minimizing the Frobenius norm of the Hessian of the model.

In the following text, the approach for how to arrive at the best possible model for one particular measurement is explained. In short, the approach checks if it is possible to build a linear model for one specific output measurements to all input control signals. If this is not possible, the input control signals with poor data are eliminated and an attempt is made to build a linear model given the remaining input control signals. If it is possible to build a linear model of some sort, the approach checks both if there is enough data and if it makes senses to add some curvature in the model, either through some quadratic terms or some terms based on first order physics.

Model Building Algorithm: Build Input-Output Models by Regression.

For each output measurement, try to build an input-output model though Steps 1 and 2 below.

Initial information about the output measurement.

Goal: Build best possible models for the output measurement e.g. total oil production from G riser subsystem.

Data: All data cases from the CDB relevant for this measurement provided by the case selection algorithm. Each case holds information about the respective measurement with uncertainty measures and the related input control signal values.

Step 1: Linear Model Structure

Part 1: Check weather a linear model can be built for all input control signals through regression Given the available data and regression tools the approach checks if it is possible estimate a linear relationship between the specific output measurement and all the input control signals. The system of equations must be decidedly overdetermined so that all parameters in the linear model can be found through regression with some measure of uncertainty. If this is not the case, due to poor or insufficient data in one or several dimensions, some input control signals should be eliminated from the model building process.

Part 2: Elimination of Control Signals

If there is not enough data in one or several dimensions, the control signals with too little excitation should be eliminated so that a simplified linear model can be built for the output measurement given a subset of the input control variables. When control signals are eliminated, this might also reduce the available cases in other dimensions. (E.g. the eliminated input control signals should preferably hold the same value in all the remaining cases). For robustness purposes, the system of equations of the regression must be decidedly overdetermined so that all parameters in the simplified linear model can be found through regression and with some measure of uncertainty.

Output:
The Best Possible Linear Input-Output Model
Step 2: Check if it Makes Sense to Add Curvature If enough cases are available and curvature is clearly present in the data given the control variables that are included in the linear model, curvature can be added. Curvature can be represented by quadratic terms or 1.order physics terms, in either one or several dimensions depending on the geometry in the data. The system of equations in the regression must be decidedly overdetermined for the resulting linear model with curvature, so that all parameters in the simplified linear model can be found through regression with some measure of uncertainty. If this is not possible, the linear model is kept as it is.

Output:
Best Possible Input-Output Model for the Particular Output Measurement.

The input-output models found through the model building algorithm serve as input to the local optimization model. If control variables are eliminated from some or all of the input-output models, these control signals must either be constants in or excluded from the local optimization model.

If the data quality is poor, poor quality input-output models (or lack there) serve as input to the local optimization model. In such cases it might be inconvenient or impossible to conduct production optimization. Then it is comforting to know that the local optimization model also serves as input to a test generation algorithm. Based on the poor quality of the data utilized for model building, this algorithm proposes step tests or oscillation tests that should contribute to more and better information about the particular control signals. Such tests should result in more high quality data and thus high quality input-output models.

EXAMPLE 1B: INPUT-OUTPUT MODELS THROUGH REGRESSION ALGORITHM EXAMPLE

This example is a sequel to example 1a above, which concerned generation of a steady state data table. Again, the real production data for the production system of FIG. 2 is used the period of 20 Apr. 2014-20 May 2014. As before, the top plot shows the gas export measurement, and the bottom plot shows the choke settings of well 1 and 2 during this period and there have been no changes in the chokes of the remaining wells of the system during this time. The vertical line 10 in FIG. 3 was used as an end point for data processing of example 1a. We now take this to be a cutoff-line between the period for data collection and the generation of the steady state data table and a period that we want to predict. The data to the left of this line (20 Apr. 2014-16 May 2014) has been used to generate the steady state case data table, ref. example 1 a, which in this example has been used for building a linear model, in order to predict what occurs to the right of the line (16 May 2014-20 May 2014). Thus, we have real-world data to compare to a prediction in order to check the accuracy of the prediction.

Figure 6:
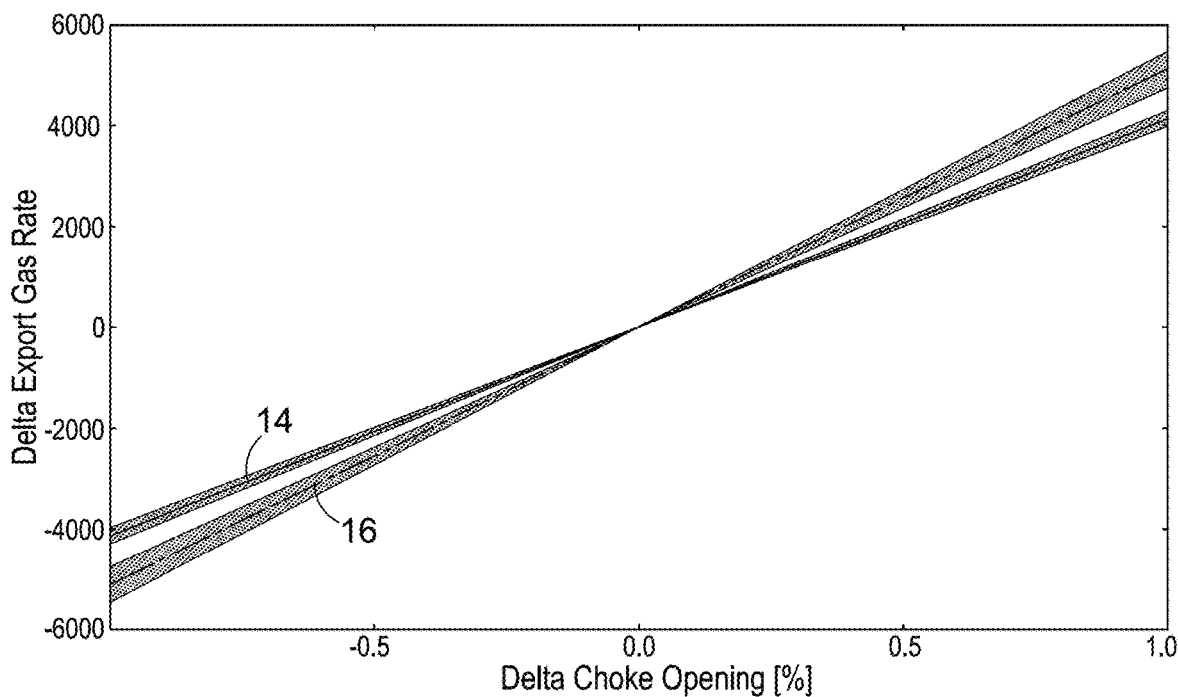
FIG. 6 illustrates a measure of the uncertainty of the linear model of FIG. 5.

A linear model is built for predicting the effect on gas production from changes to the chokes of well G1 and well G2. An operating point is calculated from a steady state interval with end time at the cut-off as indicated by the vertical line. A trust region is defined for the chokes of well 1 and well 2. This may be done as described in more detail below. The trust region ensures that the cases selected from the steady state data table by the selection algorithm all have choke values of between 35% and 45% for both well 1 and well 2. All the cases found by the selection algorithm are provided to the model building algorithm, which builds a linear model through the regression techniques. The resulting linear model is illustrated in FIGS. 5 and 6. In FIG. 5 the linear model is plotted in two dimensions, the black dots in the figure represent the steady state cases for which the model has been built. The linear model is hence a plane that is fitted to all of the data points from the steady state cases. In FIG. 6 the uncertainty measures of the linear model are shown. A first line 14 represents the linear model for changes in the choke of well 1 and a second line 16 represents the effect on the total gas export for changes in the choke of well 2. The shading around the lines represents a 90% confidence interval from the linear model predictions. It will be appreciated that the further one moves from the point of intersection, which is the centre of the linear model, then the less accurate the prediction becomes. However, for small changes close to the steady state values used for generating the linear model then there should be a high degree of accuracy.

FIGS. 7 and 8 show the results of using the linear model to predict the change in gas production when the chokes of the two wells are adjusted. The model was set-up to have changes in choke values that are equivalent to the actual changes in the recorded data in order to test the accuracy of the prediction. As can be seen from comparison of the measured data 18 and the prediction 20, when the effect of noise in the measured data is removed then the prediction 20 closely follows the actual data. Thus, the linear model is found to be accurate, at least for small changes. Since the data basis for the linear model can be continually updated after any changes, then it can always provide an accurate prediction for small changes to be made in the future.

A local optimization problem can now be built. The problem description provides information about the objective, constraints and variables. The regression algorithm provide the local input-output models with parameter uncertainty, witch estimates the effect of changes made to the production system.

An optimization problem is exemplified in its simplest form for the production system shown in FIG. 2. The optimization problem becomes a simple MILP. E.g. the total oil produced from Riser O and Riser G is to be maximized while obeying the maximum gas handling capacity topside. There is an upper limit on the allowed number of changes to the system controls, and sum of the total change in the control signals must be within a certain (trust) region. There are two subsystems; Riser O and G, in the set of subsystems S, each subsystem has a set of wells $I^s$. The set of phases P contains the phase oil, indexed o, and gas, indexed g. Production rate of phase p for system s is represented by the variable $q_{ps}$ and the control signal for a well i is represented by the variable $u_i$.

The objective is to increase the production of oil from both risers, $\Delta q_{o1}+\Delta q_{o2}$, as much as possible, given by objective function as defined in equation (5). The delta in front of the variable indicates that we are optimizing the change from the current value.

$$\max \Delta q_{o1}+\Delta q_{o2} \qquad (5)$$

Models as in equation (6) provide the local input-output system models for total oil and gas produced form each subsystem. The models are linear change models, providing the change in production, $\Delta q_{ps}$, for system s for phase p giving changes in the respective control signals, $\Delta u_s$, for system s. The structure of the models and the parameters $a_{ps}$ with uncertainty measures are provided by the model building algorithm, i.e. regression, explained in the previous section. The models also provide uncertainty measures, given the uncertainties in the parameters $a_{ps}$.

$s \in S,$ $\Delta q_{ps}=a_{ps}\Delta u_s$ $$p \in P \qquad (6)$$

There is a total gas handling capacity topside, $C_p$. Equation (7) ensures that this capacity is not exceeded. Note that the right sides of the inequalities are constant terms, i.e. the current slack to the system limit.

$$\sum_{s \in S} \Delta q_{ps} \leq C_p - \sum_{s \in S} q_{ps} \qquad (7)$$

$p \in \{g\}$

It may be desirable to limit the number of changes that the optimization proposes. Constraints defined as equations (8)-(10) and the binary variable $x_i$ make sure that we only allow changes in $\overline{X}$ number of control variables. $\overline{\Delta U}_i$ represents the maximum possible change in the control signal $\Delta u_i$ for well i.

$$\Delta u_i \leq \overline{\Delta U}_i x_i, i \in I^s \qquad (8)$$

$$\sum_{i \in I^s} x_i \leq \overline{X} \qquad (9)$$

$$x_i \in \{0, 1\}, i \in I^s \qquad (10)$$

In addition, we only allow changes of a given size, limited by a trust-region given by a maximum change in control variable values of T. This requirement is ensured by the inequality of equation (11).

$$\sum_{i \in I^s} \Delta u_i \leq T \qquad (11)$$

Based on the local optimization model, derivative-based optimization algorithms can be run to find suggested changes in control variables which will result in production improvement. One or several suggestions are provided.

The suggestions can be provided in various formats; here we will describe two options or alternatives. Alternative 1) is a list of proposed control signal changes. The list is provided together with the total expected changes in production rates with uncertainty measures. Alternative 2) also provides a list, however this list is much more advanced. Because uncertainty measures are available for all variables, statistical methods can be utilized in order to provide a ranked list of proposed control signal changes. The changes must be implemented in the exact order specified by this list. Each change is provided with the expected change in total production rates with uncertainty measures. In addition the total expected changes in total production rates with uncertainty measures are provided. All changes should be implemented in order to ensure increased oil production. Alternative 2 ensures that the wells you have most information is adjusted/changes in the right order, compared to the most uncertain wells, to reach the respective handling capacities.

The proposals are provided to the production engineer/operator who decides if one of the suggestions should be implemented in the real system. Or she/he might use the proposal together with her/his intuition to implement an adjusted strategy based on the proposal.

The local system model of equation (6) is built from the regression problem in equation (2). The usability of the optimization algorithm is to a large degree dependent on the quality (or lack thereof) of the local input-output model (6). Several approaches can be used to quantify a measure on the quality of equation (6), and to determine if it is possible to build a model. This is evaluated by studying the properties of the steady state cases/sample set selected by CDB crawling/scanning/algorithm. Particularly looking at how $u*_n{}^t$ in equation (2) spans the region of where regression is of interest, and where the local input-output model is intended to be used. If the model is linear, a good span is represent by affine independence of the selected cases/sample points. If equation (6) is a nonlinear model, the technique to establish well poisedness may be more elaborate. This can be based on known techniques relating to determination of poisedness.

The test algorithm will propose production experiments/changes that will create new steady-state cases in the CDB. The goal will be to optimize the poisedness/affine independence of the $u*_n{}^t$ in equation (2) (or e.g. the polynomial space for a nonlinear polynomial model), so that a better model as equation (6) can be created after the experiment, potentially enabling the optimization algorithm to propose better production strategies.

The compact database serves as data foundation for four model-based applications. Parameters estimation is another such application. The most interesting parameters are well specific GORs and WCs. The well specific GORs and WCs for a subsystem can be found though input-output models for total oil, gas and water flow from the subsystem given all (or several) control signals of that subsystem. These models can be built by means of the approach described above, and the models will be similar to the input-output model given by equation (1).

Thus for the parameter estimation application the following procedure applies, as explained above, the same applies for all model-based applications. When parameter estimation is initiated certain information is required: 1) the problem description, i.e. the relevant parts of the production system, relevant control signals, output measurements and 2) the operational point of interest, explained above. The details are defined by a user though a GUI or by the application itself through a scheduler/trigger. Based on this information, all relevant case data within a specified trust-region around the operating point are gathered from the correct data tables in the compact database by the CDB crawling/scanning algorithm, explained above. The data is sent to the model building algorithm, explained above, which identifies the relevant input-output models to be built given the data.

The simple local linear input-output models relevant for the parameter estimation application are then input-output models for total oil, gas and water flow from a subsystem given all (or several) control signals of that subsystem. By means of these models, the well specific marginal GORs and WCs can be found.

Models as defined by equations (12)-(14) are examples of such models. $q_p(u)$ denote the linear models for flow of phases p, (oil, o, gas, g, and water, w) from a subsystem given the control signals $u_i$ for all wells i of the subsystem i.e. the total number of n control signals. Each case provide the flow measurement $q_p*(u*^i)$ of phase p for a given configuration i of the chokes $u*^i$. Each model, one for each phase p, is found separately through regression on the t number of cases, then the parameters $a_{pi}$ for all n control signals and the parameter $b_p$ are be found for the appropriate phase p.

$$q_o(u) = a_{o1}u_1 + a_{o2}u_2 + \ldots + a_{on}u_n + b_o \quad (12)$$

$$q_g(u) = a_{g1}u_1 + a_{g2}u_2 + \ldots + a_{gn}u_n + b_g \quad (13)$$

$$q_w(u) = a_{w1}u_1 + a_{w2}u_2 + \ldots + a_{wn}u_n + b_w \quad (14)$$

The marginal GOR and WC for well i, denoted by $gor_i$ and $wc_i$ respectively, can then be calculated by means of the related parameters $a_{pi}$ given the phases p through equations (19) and (20).

$$gor_i = \frac{a_{gi}}{a_{oi}} \quad (15)$$
$$i \in 1, 2, \ldots, n$$

$$wc_i = \frac{a_{wi}}{(a_{oi} + a_{wi})} \quad (16)$$
$$i \in 1, 2, \ldots, n$$

The compact database serves as data foundation for four model-based applications. Rate estimation is one such application.

The accuracy in the well related information in the compact database is constantly improved though oscillation tests and step tests suggested by the technology described herein. This enables model-based applications that would otherwise be cumbersome or subject to large errors. Thus, due to better accuracy in well-related information (and up to date choke models) well specific rate estimations can be made possible.

A quick description of the method can be given. A problem description and operating point is provided through a GUI or a trigger. Given this information, the relevant information is found in the compact database. A modified version of the model building algorithm: Build input-output models by regression then uses the data to build the well-specific models that estimates production rates for each well.

Models can be built for all relevant output measurements. The linear model developed in this work is a choke linearization of one measurement around the current working point as given by equations (17)-(20).

$$m = f(u, p_u, p_d, T_u, T_d, GOR, WC, q_{GL}) \quad (17)$$

$$x = [u, p_u, p_d, T_u, T_d, GOR, WC, q_{GL}]^T \quad (18)$$

$$m \approx f(x^*) + \nabla f|(x - x^*) \quad (19)$$

$$m \approx ax + b \quad (20)$$

The measurement and hence the model of the measurement might be dependent on several variables such as choke opening and gas lift ($u, q_{GL}$), upstream and downstream choke pressures and temperatures ($p_u, p_d, T_u, T_d$), GOR and WC. Variables that are slowly dependent, such as GOR, can be merged with the constants. Variables that are linearly dependent can be detected and merged using e.g. principal component analysis. Then one is left with an x-vector with useful variables, possibly/hopefully only control variables i.e. choke and gas lift variables. Further in this text, we rely on this simplification. In the models provided here the x only contains control variables for choke position, i.e. one control variable for each well.

Two types of linear models are provided here. Equations (21) represent model type 1. Model type 1 is a model for a well specific output signal given the value of all the control variables of the production network. There will be one such model for each well, e.g. one such model might represent the amount of oil produced from the well j given the control variable settings of the production network. Equations (23) represent model type 2. This represent a model for a network measurement given the control variables of the production network. Such a model might total oil produced from the network as a hole given all control variable settings. The equation (22) represents the law of conservation of mass, and is only valid if the model types represent production rates. The vectors and matrices are defined in equations (22)-(27), J is the set of all wells j.

$$m_j^W = a_j^T x + b_j \quad j \in J \tag{21}$$

$$m^N = \sum_{j \in J} m_j^W \tag{22}$$

$$m^N = \sum_{j \in J} (a_j^T x + b_j) = Ax + b \tag{23}$$

$$a_j^T = [a_1, \ldots, a_J] \tag{24}$$

$$A = \begin{bmatrix} a_1^T \\ \vdots \\ a_j^T \end{bmatrix} = \begin{bmatrix} a_{11} & \cdots & a_{1J} \\ \vdots & \ddots & \vdots \\ a_{J1} & \cdots & a_{JJ} \end{bmatrix} \tag{25}$$

$$x = [u_1, \ldots, u_J]^T \tag{26}$$

$$b = \sum_{j \in J} b_j \tag{27}$$

If the two model types represent production rates, equation (22) applies and the models in (21) and (23) are dependent. The same model parameters are contained in both models. Then the model parameters in the matrix A and vector b are all de be decided upon in simultaneously for all models by interpolation or regression/least squares. Otherwise, the models are independent and the model parameters can be found for each model independently through interpolation or regression.

Data from the steady state and derivative cases stored in the compact database are applied. A derivative cases derived from the oscillation tests typically contains one or more slope values $a_{ji}$.

Depending on the measurement, the number of cases with information about the signal varies. Information about total production rates are, with few exceptions, always part of a case. Thus, it is normally a sufficient amount of independent cases available to build a model for e.g. total oil production. Oil production rates from a certain well however, can only be found at certain points in time and only few cases are available with information about these measurements. Thus, finding the model parameters for these models together, might pose a challenge when little information is available about each well.

An alternative linear model is given here. This model also consider time, routing and on/off settings. Equation (28)-(32) represent the resulting models.

$$m_j^W = a_j^T x + b_j + c_j t + d_j^T e(x) \quad j \in J \tag{28}$$

$$m^N = \sum_{j \in J} m_j^W = Ax + b + ct + De(x) \tag{29}$$

$$D = \begin{bmatrix} d_1^T \\ \vdots \\ d_j^T \end{bmatrix} = \begin{bmatrix} d_{11} & \cdots & d \\ \vdots & \ddots & \vdots \\ d_{J1} & \cdots & d_{JJ} \end{bmatrix} \tag{30}$$

$$c = \sum_{j \in J} c_j \tag{31}$$

$$e(x) = \begin{cases} 1 & hvis\ x_i = 0 \\ 0 & ellers \end{cases} \tag{32}$$

Possible Extensions to Model Building:
Model Building
Model evaluations and improvements
Model improvement algorithms
Calculate poisedness: Derivative-free methods must guarantee some form of control of the geometry of the sample sets where the function is evaluated. An example of a measure of geometry is the Λ-poisedness constant, which should be maintained moderately small and bounded from above when building interpolation models.
Production Improvement Problem:
List with rated proposed amendments
Include constraint based on the Wedge method: The Wedge method follows the approach of attempting to generate points which simultaneously provide sufficient increase in model/objective function and also satisfy the Λ-poisedness condition. At every iteration the optimization problem in the step calculation is augmented by an additional constraint which does not allow the new point to lie near a certain manifold.
Trust region management. Sophisticated method for modifying the trust region radius

EXAMPLE 3—CLASSIFICATION OF A PRESSURE SIGNAL

To classify pressure samples as stable or transient, a set of data suitable for supervised learning must be created first. Measurements are resampled to a uniform rate of e.g. one sample every 1 minute. A window size of 61 is used, giving 30 samples of context on either side of the middle sample.

Each data point is then classified. FIG. 9 illustrates this for one window. Samples marked with blue are labelled as stable and samples marked with red are labelled as transient. The classifiers task is to determine this labelling. The green circle marks the middle sample.

Asset dynamics are then classified/derived from a multiple of signals (and their classified signal behaviour). Individual signal classifications/labels together with signal data inside the context windows are combined to identify which asset dynamics is active at the point time of question. And optionally, with what certainty or uncertainty one could say that it is active. The framework comprises a distinct set of logical rules combined with a distinctly trained neural net, applied to a subset (or all) signals for each asset dynamic, to determine/classify if the respective asset dynamic is active or not.

The logical rules and the neural net will typically look at/address the classification label (stable, oscillating, transient) and the signal itself inside the context window, for all or a subset of the control signals, together with all or a subset of the state signals; to determine if the respective asset dynamic becomes/starts to be active. A large change in one or more control signals will typically activate one or more asset dynamics.

Further, to determine if an asset dynamic fades out/ends, i.e. stops to be active, the logical rules together with the neural net will assure that the control signal(s) has been stable for certain amount of time, and that the relevant state signals become stable (i.e. goes from transient or oscillating to stable).

Both the signal's classified/labelled behaviour (stable, oscillating, or transient), and the respective signals themselves inside the context window is needed to determine if an asset dynamic is active.

The general framework/algorithm for asset dynamic classification is outlined below:

1. For all relevant signals; run a signal behaviour classification framework over the desired time span, i.e. context window, and classify middle or all data-points into either; stable, oscillating, or transient.
2. For all asset dynamics in question apply logical rules to identify if the respective asset dynamic is active or not.
3. Return/store label information, i.e. which asset dynamic that is active, and optionally the statistical certainty of this label, for the middle sample, some samples or all samples/data-points.
4. Optionally: a) repeat the framework in a real-time sliding window setting, and/or b) group adjacent data-points into a compact database.
5. Optional: If 4.a. is applied it is possible to store the classification information in a database, if both 4.a. and 4.b. is applied jointly, store information in a compact database.

Once the asset dynamics are known then the datasets within the signal can be categorised.

EXAMPLE 4: DEPLETION AND PIPELINE TRANSIENT ASSET DYNAMICS

An asset dynamic defined as "depletion" refers to a drop in average reservoir pressure due to production draining the reservoir over time. Water or gas injection will counter this effect. To detect if this asset dynamic is active or not, the logic rules involved will address the wells bottom hole pressure (BHP) (if this is not available well head pressure can be used as proxy). It will be used a long context window of 1 week or more (probably 1 month or more). If the pressure state signal is transient in the sections where the choke control signal for the same well is stable, then the asset dynamic "depletion" is deemed to be active.

An alternative set of logical rules that can be used to detect depletion is to first detect active build-up asset dynamics, and then to compare the value that the BHP converges to between each time build-up asset dynamics are active in the same well, and check if this value is declining.

To determine if the asset dynamic "pipeline transient due to control changes" is active or not then the method addresses a context window of 1-12 hours (maybe up to 24 hours) for the choke valve control signal, and the pressure state signal. The relevant logical rule is if the control signal is transient, and the pressure state signal becomes transient, then the "pipeline transient" asset dynamic is deemed to be active. When the pressure state signal is no longer transient, i.e. stable or oscillating, this asset dynamic is no longer active.

FIG. 10 illustrates the choke valve setting and the related pressure measurement in an example of determining if the "pipeline transient" asset dynamic is active. In the first and second plots, the shaded intervals are classified as transient, and the non-shaded intervals are classified as stable. In the third, bottom, plot the hatched regions are the intervals where both choke and pressure are classified as stable, and therefore the "pipeline transient due to control changes" is labelled as not active. In the region without hatching, the choke control signal has been transient (in the beginning of the period), and the pressure state signal is still transient. The asset dynamic "pipeline transient due to control changes" is hence labelled as active. It will be appreciated that the stable intervals could themselves be assigned a category dependent on other logical rules, and that a similar change in pressure with a different change in control signal (or a different change in other factors) could be assigned a different category for a different transient event.

EXAMPLE 4—FLUSH PRODUCTION CATEGORY

Flush production is a dynamic present in wells that have been recently opened after a shutdown period (other definitions also exist). A category for flush production is one of the possible categories for stable production. It is characterized by a short-lived boost in oil rate. It can be detected by a significant pressure transient that lasts much longer than usual after the last choke change.

EXAMPLE 5—BUILD-UP CATEGORY

In the case of build-up the well choke is closed and well pressure is increasing. This category can be detected by (amongst other things) the choke being below a threshold and the well pressure being transient and increasing.

EXAMPLE 6—SLUGGING CATEGORY

Slugging is an oscillating operating state with stable chokes where liquid is produced in bursts. This category can be identified detected by stable choke settings, and, for instance, oscillating riser pressure.

EXAMPLE 7—A FRAMEWORK FOR CLASSIFICATION OF ACTIVE ASSET DYNAMICS

A framework for determine which asset dynamics are active at a certain point in time has two natural extensions that it often will be used together with. Firstly, it will typically be used repetitively in a real-time setting, either alerting the operator and/or field engineer and/or production engineer and/or process engineer (The User) or to present a real-time indication of the asset dynamics that are active. Secondly, one will typically not determine which asset dynamics that are active at a specific point in time, but rather one will determine intervals over which the respective asset dynamics are active. Further, these intervals may be gathered together into a database.

Therefore, there are three ways of using an asset dynamic classification framework:

1. The User requests the system/framework/algorithm(s) to determine which asset dynamics are active at a given point in time. This may be current time a time in the past.
2. The system/framework runs repetitively in real-time (e.g. every 10 second, every 1 minute, every 1 hour, every 24 hours) and; a) displays/determine which asset dynamics that are active, or b) alert The User when predefined sets of asset dynamics are active or anomalies in the pattern of asset dynamics occur. This information can be stored in a database.

3. In a the context window, or over multiple context windows in a sliding window setting;

a. identify adjacent/neighbouring data-points where the same asset dynamics are active and define time intervals which comprise datasets, then identify statistics relevant to those datasets, for example with start-time, end-time, average value, slope, standard deviation on average value estimate, and other relevant statistics, etc.

b. Use the identification of time intervals in step (3.a.) in a repetitive real-time setting or on a historical dataset and gather together all data into a compact database

1. Relevant Definitions

Basis

A positive basis in $\mathbb{R}^n$ is a positively independent set whose positive span is $\mathbb{R}^n$. Consider a sample set $Y=\{y^0, y^1, \ldots, y^p\}$ from the real function $f(y^i)$. Each sample point consists of variables in n+1 dimensions, and there is p+1 sample points. By using these sample points, $f(y^i)$ can be approximated by the model m(x), where $f(y^i)=m(y^i)$. We can express a linear model of the real function in the following manner; $m(x)=\alpha_0+\alpha_0 x_i + \ldots + \alpha_n x_n$. Using as a basis for the polynomial space $\mathcal{P}_n^1$ of linear polynomials of degree 1, the polynomial basis $\phi=\{1, x_1, \ldots, x_n\}$.

Poisedness

Consider a sample set $Y=\{y^0, y^1, \ldots, y^p\}$. The sample points consist of variables in n+1 dimensions, and there is p+1 sample points. The real function $f(y^i)$ is approximated by the model $m(y^i)$ which is a polynomial of degree d.

$$m(y^i) = f(y^i), i = 0, \ldots, n$$

$$\begin{bmatrix} 1 & y_1^0 & \ldots & y_n^0 \\ \vdots & \vdots & \vdots & \vdots \\ 1 & y_1^n & \ldots & y_n^n \end{bmatrix} \begin{bmatrix} \alpha^0 \\ \vdots \\ \alpha_n \end{bmatrix} = \begin{bmatrix} f(y^0) \\ \vdots \\ f(y^n) \end{bmatrix}, M = M(\phi, Y) = \begin{bmatrix} 1 & y_1^0 & \ldots & y_n^0 \\ \vdots & \vdots & \vdots & \vdots \\ 1 & y_1^n & \ldots & y_n^n \end{bmatrix}$$

Polynomial basis $\phi$ is of degree 1. M is written as $M(\phi,Y)$ to highlight the dependence of M on the basis $\phi$ and the sample set Y.

Interpolation

The set $Y=\{y^0, y^1, \ldots, y^{p=n}\}$, is poised for polynomial interpolation in $\mathbb{R}^n$ if the corresponding matrix $M(\phi,Y)$ is non-singular for some basis $\phi$ in $\mathcal{P}_n^d$.

Linear Regression

The set $Y=\{y^0, y^1, \ldots, y^p\}$, is poised for polynomial least squares regression in $\mathbb{R}^n$ if the corresponding matrix $M(\phi, Y)$ has full column rank for some basis $\phi$ in $\mathcal{P}_n^d$.

$\Lambda$-Poisedness $\Lambda$-poisedness is a poisedness constant that reflects how well the sample set spans the region where interpolation/regression is of interest. $\Lambda$-poisedness depends on the sample set, the region considered and the polynomial space for which an interpolant is chosen.

Interpolation

The $\Lambda$-poisedness value can be seen as a distance to linear independence. If $\Lambda=1$, the sample set is ideal. The model deteriorates as the $\Lambda$-poisedness becomes larger. As $\Lambda$ grows, the system represented by the vectors $\phi(y^i)$ becomes increasingly linearly dependent. Actual distance to singularity depends on the choice of $\phi(y^i)$. It does not depend on scaling of sample set or shift in coordinates.

Regression $\Lambda$-poisedness can be defined in the regression case for cases where the number of sample points is held fixed. Most of the properties of the $\Lambda$-poisedness in the interpolation sense, extend to the regression case easily. Strong poisedness is defined when the number of sample points is allowed to grow, and reflects how well the sample points are spread in space to form poised subsets.

Minimum Frobenius Norm Model

Typically in a derivative-free optimization framework which uses incomplete interpolation it is desirable to construct accurate linear models and then enhance them with curvature information, hoping that the actual accuracy of the model is better than that of a purely linear model. Poisedness in the minimum Frobenius norm sense implies poisedness in the linear interpolation or regression sense, and as a result, poisedness for quadratic underdetermined interpolation in the minimum-norm sense.

Model Improvement Algorithms

Such algorithms can be implemented based on known techniques for model improvement. The first category of algorithms deal with non-poised data sets, the aim is to construct poised interpolation or regression sets. The second category of algorithms improves and maintains the $\Lambda$-poisedness of already poised data sets. The algorithms are based on constructing Lagrange polynomial bases or other (similar) polynomial bases and using those as a guide for modification of the sample sets.

Trust Region

A function can be estimated by a model. The model should be built around the current point, and with some degree of arbitrariness one should decide on a region containing the current point in which one believes that the model will represent the function more or less adequately. Such a region is called a trust region.

In our case a trust-region serves two purposes:

1. Model

It defines the neighbourhood in which the points are sampled for the construction of the model. Models like polynomial interpolation or regression models do not necessarily become better when the radius of the trust region is reduced.

2. Optimization

It restricts the step size to the neighbourhood where the model is assumed to be good.

We first define a model $m_k(x)$ whose purpose is to approximate a function (total productions or pressures) within a suitable neighbourhood of $x_k$, the trust region. The trust region can be defined as the set of all points $$\mathcal{B}_k = \{x \in \mathbb{R}^n \mid \|x - x_k\|_k \leq \Delta_k\}$$

where $\Delta_k$ is called the trust-region radius.

The norm defining the trust region may vary in order to exploit the geometry of the underlying problem as effectively as possible.

Traditional Trust Region Management:

1. Trust Region Derivative-Based Methods

In derivative-based methods, under appropriate conditions, the trust region radius becomes bounded away from zero when the iteration converges to a local minimizer; hence its radius can remain unchanged or increase near optimality.

2. Trust Region Derivative-Free Methods

The actual reduction in the objective function is compared to the predicted reduction in the model. If the comparison is good, the new step is taken and the trust-region radius is increased. If the comparison is bad, the new step is rejected and the trust-region radius is decreased. In derivative-free optimisation it is important to keep the radius of the trust-region comparable to some measure of stationarity so that when the measure of the stationarity is close to zero the models become more accurate.

The invention claimed is:

1. A method for recording data relating to the performance of an oil and gas flow network, the method comprising:
   (1) gathering data covering a period of time, wherein the data relates to the status of control point(s) within the flow network and to flow parameter(s) of interest in one or more flow path(s) of the flow network;
   (2) identifying multiple time intervals in the data during which the control point(s) and the flow parameter(s) can be designated as being in a category selected from multiple categories relating to different types of stable production and multiple categories relating to different types of transient events, wherein the data hence includes multiple datasets each framed by one of the multiple time intervals;
   (3) assigning a selected category of the multiple categories to each one of the multiple datasets that are framed by the multiple time intervals, wherein the selected category is determined by determining the asset dynamics that are present for the multiple datasets using an asset dynamic classification framework;
   (4) extracting statistical data representative of some or all of the datasets identified in step (2) to thereby represent the original data from step (1) in a compact form, wherein compaction comprises including details of the category assigned to each dataset in step (3) as determined based on the asset dynamics that are present in each dataset; and
   (5) assessing production of the flow network using the statistical data extracted at step (4);
   wherein the control points within the flow network comprise one or more of valves, pumps, compressors, gas lift injectors, and expansion devices, and wherein an adjustment of the control points effects flow of fluid within the flow network including one or more of pressure, flow rate, flow level, temperature, a ratio of gas to liquid, density, or pH.

2. The method of claim 1, wherein step (1) includes gathering the data over a long context window of a period of time of at least a month.

3. The method of claim 1, wherein step (2) includes identifying at least 100 time intervals.

4. The method of claim 1, wherein the multiple categories relating to stable production include: stable steady state production; stable production with flush production from one or more wells; stable production with slugging dynamics present, such as casing heading, severe slugging or other slugging dynamics; and stable production including sand production.

5. The method of claim 1, wherein the multiple categories relating to transient events include one or more active event categories such as: well testing events, active process events, active well events, and/or active reservoir events.

6. The method of claim 1, wherein the multiple categories relating to transient events include one or more passive event categories such as: passive process events, passive reservoir/well events or sensor error events.

7. The method of claim 1, wherein the method includes determining which category should be selected at step (3) by determining what combination of asset dynamics are present for the dataset, where an asset dynamic is a phenomena or event that occurs during the time interval for datasets in one or more of the categories.

8. The method of claim 7, wherein the asset dynamics include some or all of: depletion, flush production, build-up, draw-down, pipeline transients due to control changes, slugging dynamics, production system fluctuation and reservoir composition dynamics.

9. The method of claim 1, wherein there are multiple categories assigned for at least some data points in the data such that for those data points there are overlapping time intervals that define overlapping datasets, where each dataset has a different category.

10. The method of claim 1, wherein identifying a time interval with a dataset that can be categorised as one of the multiple categories of stable production requires at least one of:
    a time period longer than a predefined minimum during which there has been no change to a control point outside of a certain threshold; and that there are no changes to the control points for a minimum time of up to 12 hours prior to a point where the time interval may start.

11. The method of claim 1, wherein the time period for a potential time interval with a dataset that can be categorised as one of the multiple categories of stable production is not be allowed to continue after a point where new changes are made to any of the control point(s).

12. The method of claim 1 comprising: including the use of at least one of historical data and live data.

13. The method of claim 1, wherein step (4) includes gathering and storing the statistical data in tabular form as a compact data table, the compact data table including the categories from step (3) and statistics representative of each of the time intervals from step (4).

14. The method of claim 1, comprising using the statistical data extracted at step (4) in the assessment of factors relating to performance of the flow network including production rate as well as the integrity of the flow network.

15. The method of claim 1, wherein the statistical data from step (4) is used in order to identify relationships between the status of the control points and the flow parameters and to allow a local model to be formed to represent the relationships.

16. The method of claim 1, wherein the control points are any means capable of applying a controlled adjustment to the flow network, in particular an adjustment to the flow of fluid within the network, such as one or more of flow control valves, pumps, compressors, gas lift injectors, expansion devices and so on.

17. The method of claim 1, wherein the flow parameter(s) measured are any parameter that is affected by the adjustment(s) applied at the control point(s), such as one or more of pressure, flow rate (by volume or flow speed), flow level, temperature, a ratio of gas to liquid, proportions of certain components within the flow, density or pH.

18. The method of claim 1, wherein the flow parameter(s) relate to one or more flow path(s) in which flows of more than one of the different branches within the flow network have been combined.

19. The method of claim 1, comprising producing data.

20. A non-transitory computer-readable medium storing computer-executable instructions for execution on a data processing apparatus arranged to receive data relating to control points and flow parameters in a flow network; wherein the instructions, when executed, will configure the data processing apparatus to carry out a method as claimed in claim 1.

\* \* \* \* \*